United States Patent
Koppel et al.

(10) Patent No.: US 11,080,634 B2
(45) Date of Patent: Aug. 3, 2021

(54) DEVICE, SYSTEM AND METHOD FOR MONITORING USAGE OF FUNCTIONAL FACILITIES

(71) Applicant: LOCATEE AG, Zurich (CH)

(72) Inventors: Benedikt Andreas Koppel, Zurich (CH); Thomas Kessler, Chur (CH); Alexander Fabian Mulli, Zurich (CH); Georg Nebehay, Zurich (CH)

(73) Assignee: LOCATEE AG, Zurich (CH)

( * ) Notice: Subject to any disclaimer, the term of this patent is extended or adjusted under 35 U.S.C. 154(b) by 0 days.

(21) Appl. No.: 16/788,523

(22) Filed: Feb. 12, 2020

(65) Prior Publication Data

US 2020/0184397 A1    Jun. 11, 2020

Related U.S. Application Data

(63) Continuation of application No. 16/088,772, filed as application No. PCT/EP2017/057243 on Mar. 28, 2017, now Pat. No. 10,600,013.

(30) Foreign Application Priority Data

Mar. 29, 2016 (EP) .................................. 16162515

(51) Int. Cl.
   *G06Q 10/06* (2012.01)
   *G06Q 10/08* (2012.01)
   *G08B 21/22* (2006.01)

(52) U.S. Cl.
   CPC ..... *G06Q 10/06315* (2013.01); *G06Q 10/063* (2013.01); *G06Q 10/08* (2013.01); *G08B 21/22* (2013.01)

(58) Field of Classification Search
   None
   See application file for complete search history.

(56) References Cited

U.S. PATENT DOCUMENTS 9,300,925 B1 * 3/2016 Zhang ................... G01S 3/7865
9,355,236 B1   5/2016 Kratz et al.
(Continued)

FOREIGN PATENT DOCUMENTS

JP    2000-508136    6/2000
KR    2020-0030282   3/2020

OTHER PUBLICATIONS

Written Opinion of the International Preliminary Examining Authority for PCT/EP2017/057243, dated May 14, 2018.
(Continued)

*Primary Examiner* — Carlos Garcia
(74) *Attorney, Agent, or Firm* — Bryan D. Zerhusen, Esq.; Nicholas R. Herrel, Esq.; Cantor Colburn LLP

(57) ABSTRACT

Disclosed embodiments relate to a system for monitoring the usage of a functional facility, the system comprising (i) a plurality of detectors for detecting the presence of at least one client device in the functional facility and which detectors are geographically mapped in the functional facility; and (ii) a client device mapping module for determining the location of the at least one client device detected by one or more of the plurality of detectors. Moreover, the invention is directed to a method for monitoring the usage of a functional facility including one or more detectors, comprising the steps (1) detecting an operable engagement made between a detector deployed in the functional facility and a computerized client device; (2) determining a location point of the computerized client device; and (3) providing an
(Continued)

output which is descriptive of the detected operable engagement along with information relating to the determined location point.

21 Claims, 17 Drawing Sheets

(56) References Cited

U.S. PATENT DOCUMENTS

| | | | |
|---|---|---|---|
| 9,925,101 B2 | 3/2018 | Kuenzler | |
| 2009/0079243 A1 | 3/2009 | Kunzler et al. | |
| 2009/0135133 A1 | 5/2009 | Kunzler et al. | |
| 2010/0295656 A1* | 11/2010 | Herickhoff | G06Q 50/265 340/3.1 |
| 2011/0238079 A1 | 9/2011 | Hannaford et al. | |
| 2011/0254681 A1* | 10/2011 | Perkinson | G08B 25/14 340/506 |
| 2012/0096490 A1* | 4/2012 | Barnes, Jr. | H04W 4/23 725/34 |
| 2013/0113252 A1 | 5/2013 | Kuenzler | |
| 2015/0061825 A1* | 3/2015 | Suzuki | H04W 4/21 340/5.52 |
| 2015/0227180 A1 | 8/2015 | Rabii | |
| 2015/0317833 A1 | 11/2015 | Ebstyne et al. | |
| 2017/0116402 A1 | 4/2017 | Hirabayashi et al. | |
| 2018/0251031 A1 | 9/2018 | Liebau et al. | |

OTHER PUBLICATIONS

Korean Office Action for Application No. 10-2018-7025440, dated Nov. 21, 2019.
Japanese Office Action dated Aug. 20, 2019, for JP-2018-563943 (with Translation).
Korean Office Action for Application No. 10-2020-7014460, dated Sep. 16, 2020 (with English translation).
U.S. Appl. No. 16/088,772, filed Sep. 26, 2018, US 2019-0108467 A1.
Communication Pursuant to Article 94(3) EPC, issued on Dec. 10, 2020, for Patent Application No. 17713675.1.
Korean Notice of Preliminary Rejection for Application No. 10-2020-7033195, dated Jan. 13, 2021.
European Examination Report dated Jun. 19, 2019, for EP 17708533.9.
International Search Report and Written Opinion from PCT/EP2017/055183, dated May 11, 2017.
U.S. Appl. No. 16/088,772, filed Sep. 26, 2018, U.S. Pat. No. 10,600,013.

* cited by examiner

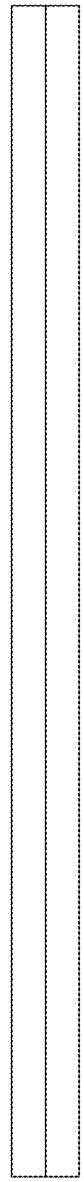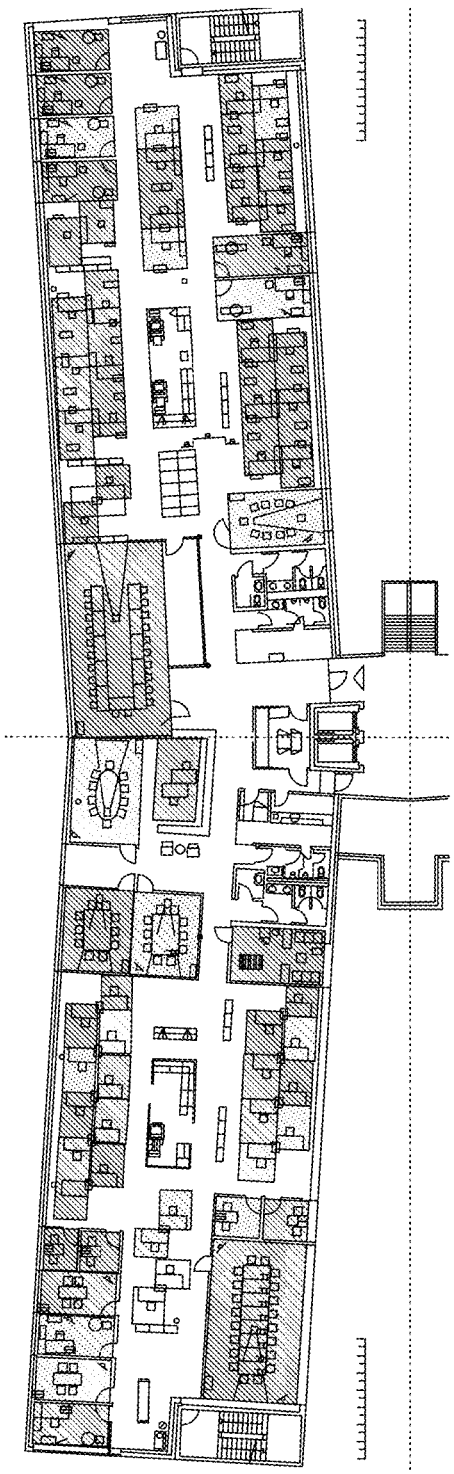
FIG. 16

DEVICE, SYSTEM AND METHOD FOR MONITORING USAGE OF FUNCTIONAL FACILITIES

CROSS-REFERENCE TO RELATED APPLICATIONS

This application is a U.S. Continuation Patent Application of U.S. patent application Ser. No. 16/088,772, filed on 26 Sep. 2018, which is a National Stage of PCT/EP2017/057243, filed on 28 Mar. 2017 titled, DEVICE, SYSTEM and METHOD FOR MONITORING USAGE OF FUNCTIONAL FACILITIES, which claims the benefit and priority to European Application No. 16162515.7, filed on 29 Mar. 2016, all of which are incorporated by reference in their entirety for all purposes

BACKGROUND

The management of a functional facility such as an open-plan office includes provisioning and ensuring the allocation of sufficient resources that may be used during various periods of times by one or more individuals occupying the functional facility. Such resources can include, for example, office equipment, communications systems layout, workspaces (e.g., collaborative workspaces), sanitary facilities, and the like. Hence, the occupancy of a functional facility is an important factor for estimating the operating costs of the facility and lost rental income due to vacancy rates.

Overview

Example 1 concerns a system for monitoring usage of a functional facility, comprising (i) a plurality of detectors for detecting the presence of at least one client device in the functional facility, wherein the plurality of detectors are geographically mapped in the functional facility; and (ii) a client device mapping module for determining the location of the at least one client device detected by one or more of the plurality of detectors.

Example 2 includes the subject matter of example 1 and, optionally, wherein the client device mapping module is configured to perform the following steps: determining an estimate of a location point pertaining to a first client device which is associated with a user and wirelessly coupled with at least one of the plurality of detectors; detecting a wired LAN connection that is made by a second client device associated with the user with at least one other of the plurality of detectors; and determining a distance between the estimated location point pertaining to the first client device and the location associated with the at least one other of the plurality of detectors; and if the distance is within a certain range, mapping the first client device to the location of the at least one other of the plurality of detectors and associating the location with a corresponding classification category; and if the distance is outside a certain range, associating the location of the at least one other of the plurality of detectors with another classification category.

Example 3 includes the subject matter of examples 1 or 2 and, optionally, wherein the client device mapping module provides an output which is indicative of the usage of the functional facility during a time interval, based on the location of the at least one client device in the functional facility during the time interval.

Example 4 includes the subject matter of any one of the examples 1 to 3 and, optionally, further comprises an anonymization module for anonymizing identifiers that are associated with geographically mapped client devices prior to providing an output, which is indicative of the usage of the functional facility during a time interval.

Example 5 includes the subject matter of any one of the examples 1 to 4 and, optionally, further comprises a wire-based detector mapping module for the mapping of the LAN connections with ports of network switches, wherein the wire-based detector mapping module employs a caching procedure for the mapping of the LAN connections.

Example 6 includes the subject matter of any one of the examples 1 to 5 and, optionally, comprises a monitoring engine, the monitoring engine being operable for (a) detecting an operable engagement made between a detector deployed in the functional facility and a computerized client device; (b) determining a location point of the computerized client device; and (c) providing an output which is descriptive of the detected operable engagement along with information relating to the determined location point.

Example 7 concerns a method for monitoring usage of a functional facility including one or more detectors, comprising the following steps: (1) detecting an operable engagement made between a detector deployed in the functional facility and at least one computerized client device; (2) determining a location point of the at least one computerized client device; and (3) providing an output which is descriptive of the detected operable engagement along with information relating to the estimated location point.

Example 8 includes the subject matter of example 7 and, optionally, further comprises determining a plurality of time intervals for a respective plurality of client devices, each of the time intervals indicating a dwell time duration of each client device at the respective estimated location points.

Example 9 includes the subject matter of examples 7 or 8 and, optionally, applying a filter logic on the estimated location points to obtain location information for a selection of the client devices that are operably engaged wirelessly with a plurality of detectors.

Example 10 includes the subject matter of example 9 and, optionally, performing cluster analysis on data which is descriptive of the estimated location points for the selection of client devices and the associated time stamps of recordation of the estimated location points.

Example 11 includes the subject matter of any one of the examples 7 to 10 and, optionally, comprises providing a heat map which is indicative of the usage of an area in the functional facility during a time interval.

Example 12 concerns a computer program product with a program code for the execution of the method steps according to any of the examples 7 to 11, wherein the computer program product is executed on a computer.

Example 13 concerns a computer program product which can be loaded into an internal storage of a digital computer and comprising software code with which the steps according to claims 7 to 11 are executed when the computer program product is loaded or run on a computer.

Example 14 concerns a computer program product directly loadable into the internal memory of a digital computer, comprising software code portions for performing the steps of examples 7 to 11 when the product is run on a computer.

Example 15 concerns a computer program tangibly embodied in an information carrier, for example, in a non-transitory computer-readable or non-transitory machine-readable storage device and/or in a propagated signal, for execution by or to control the operation of the steps of examples 7 to 12.

This Overview introduces a selection of concepts in a simplified form that are further described below in the Description of the Figures and the Detailed Description. This Overview is not intended to identify key features or essential features of the claimed subject matter, nor is it intended to be used to limit the scope of the claimed subject matter.

DESCRIPTION

Aspects of embodiments relate to devices, systems and methods for monitoring and analyzing the usage of functional facilities by individuals or users to allow, for example, estimating the operating costs of a functionality facility and, in response thereto, optimizing facility parameters, optionally automatically. Optionally, aspects of embodiments further relate devices, systems and methods for determining a level of occupancy (also: level of usage) of various locations in and/or of a functional facility at a selected time stamp and/or during a selected period of time.

In embodiments, the system comprises (i) a plurality of detectors for detecting the presence of at least one client device in the functional facility and which detectors are geographically mapped in the functional facility; and (ii) a client device mapping module for determining the location of the at least one client device detected by one or more of the plurality of detectors. Moreover, the invention is directed to a method for monitoring the usage of a functional facility including one or more detectors, comprising in some embodiments the steps of (1) detecting an operable engagement made between a detector deployed in the functional facility and a computerized client device; (2) determining a location point of the computerized client device; and (3) providing an output which is descriptive of the detected operable engagement along with information relating to the determined location point. A further aspect of the invention concerns a computer program product for practicing the claimed method.

In an embodiment, the monitoring of the usage of the functional facility may be based on the measurement of dwell times of client devices at estimated location points. Optionally, the monitoring of the usage of the functional facility may be exclusively limited on the measured dwell times. Optionally, a client device may be considered to "dwell" at an estimated location point if the measured dwell time meets a dwell time criterion such as, for example, if dwell times exceed a dwell time threshold of, e.g., at least 3 minutes, at least 4 minutes, at least 5 minutes, at least 6 minutes, at least 7 minutes, at least 8 minutes, at least 9 minutes, at least 10 minutes, at least 20 minutes, or at least 30 minutes, at least 60 minutes, or at least 120 minutes. Optionally, dwell times that do not meet the dwell time criterion such as, for example, dwell times which are below another dwell time threshold of e.g., less than 3 minutes, less than 2 minutes, less than 1 minute, or less than 30 seconds, may be disregarded or filtered out when determining usage of the functional facility. Exemplarily, dwell times which do not meet the dwell time inclusion criterion may not be considered sufficient long in order to establish that the corresponding location is actually "occupied" by a user. It is noted that "not meeting the dwell time criterion" may herein optionally be referred to as a condition in which the dwell time does meet a "dwell time discard criterion".

Optionally, the system may be operative to monitor usage of the functional facility without tracking or without requiring tracking the movement of the computerized client devices between different estimated location points. In other words, the system may not gather information pertaining to the motion path of a client device. Accordingly, information pertaining to an instant time-position tuple that does not relate to a dwell time may not be taken into account when monitoring usage of the functional facility. Optionally, data that is descriptive of location information pertaining to client devices that are substantially constantly changing their location may not be stored in or disregarded by the system. Optionally, data that is descriptive of an instant time-position tuple that does not relate to a dwell time may not be stored and/or disregarded by the system.

A first estimated location point for which it was determined that the client device "dwells" may be considered to be "different" from a second estimated location point for which it was subsequently determined that the client device "dwells" if, for example, a distance between the two location points is at least 2 meters, at least 3 meters, at least 4 meters, at least 5 meters, at least 6 meters, at least 7 meters, at least 8 meters, at least 9 meters, at least 10 meters, at least 15 meters, at least 20 meters, or at least 25 meters.

It should be noted that the terms "estimating" and "determining", as well as grammatical variations thereof, may be used interchangeably.

In some embodiments, the devices, system and methods may be operative to monitor simultaneously the usage of hundreds (e.g., 200 or more) or thousands (e.g., at least 1000 or 2000) of functional facilities. In some embodiments, the devices, systems and methods may be operative to provide its operator with an output that includes or represents values which relate to parameters concerning the usage of functional facilities recorded, e.g., during a monitored time period and/or at a given time-stamp. In an embodiment, the output may, for example, be presented as a heat map. In an embodiment, the output may be provided in a time-lapsed manner. Example time lapse ratios for displaying an output concerning data collected during monitored time period may be, for example, at least 1 min/sec, at least 15 min/sec, at least 60 min/sec, at least 90 min/sec or at least 120 min/sec. Correspondingly, a time-lapse output may be provided at a speed which can be, e.g., at least 60 times, 900 times, 3600 times, 5400 times or at least 7200 faster than the actual duration of the monitored time period. In some embodiments, a time lapse output may range from, e.g., 1 min/sec to 120 min/sec; from 15 min/sec, to 60 min/sec, from 60 min/sec to 90 min/sec, from 1 min/sec to 15 min/sec, from 1 min/sec to 60 min/sec, from 60 min/sec to 90 min/sec or any other range. In some embodiments, a time lapse output may be provided dynamically. For instance, during a given time period, the output may range from 1 min/sec to 120 min/sec. In some embodiments, the time lapse output may be adjusted automatically by the system according to an activity criteria. For example, at time periods where changes in usage are comparatively slower, the time lapse may be increased. Conversely, at time periods where changes in usage are comparatively more frequent, the time lapse may be decreased. In an embodiment, the time lapse may be selectively adjusted by the operator.

In some embodiments, the system may be operative and configured to provide values of statistical measures relating to functional facility usage. Non-limiting examples of statistical measures may include peak, minimum, average, median, correlation, percentile and/or standard deviation relating to collected facility usage data. For example, a peak usage value of a certain time period may be provided along with a corresponding time-stamp. In some embodiments, the time period and the type of statistical measure relating to the observations made during the said time period may be selected by the system's operator.

In some embodiments, the system is operative to monitor the usage of a functional facility having a given spatial and/or functional structuring. Based on data descriptive of the usage gathered during the monitoring, the system may provide outputs suggesting modifications of the given spatial structure and/or functional structure of the facility to obtain more efficient utilization of the functional facility given the resources available. Optionally, the system may determine and output the optimal the spatial and/or functional structuring of the facility, given the available resources.

The term "usage", as used herein, may for example refer to "occupancy", "dwell time" and/or "throughput". Functional facilities may comprise, for example, office buildings, shopping malls, business centers, hospitals, commercial facilities, industrial facilities, storage facilities, school campuses, public recreational areas, public transportation stations, and/or car parking facilities such as multi-story parking garages. The terms "functional facility" and "facility" may herein be used interchangeably.

The term "user", as used herein, may refer to any person which is associated with a computerized client device, e.g. through carrying, driving, transporting, or otherwise at least translationally moving along with the device within such functional facility substantially in synchronization.

The term "computerized client device" may refer, for example, to a multifunctional mobile communication device also known as "smartphone", a personal computer, a laptop computer, a tablet computer, a personal digital assistant, a wearable device, a handheld computer, a notebook computer, a vehicular device and/or any movable object which is operative to send and/or receive data wirelessly and to process received data. The terms "computerized client device" and "client device" may herein be used interchangeably.

The one or more client device detectors (or simply: "detectors") that are located in a functional facility may be associated with data descriptive of facility location information to obtain detector location information.

In some embodiments, a "detector" may be capable of converting a physical stimulus into processable electronic data. As such, a detector may also have sensing capabilities. For example, detectors deployed in a functional facility may be capable of sensing received electromagnetic (EM) signal strength, the location of a client device emitting EM radiation, and/or other parameters related to electromagnetic radiation. Moreover, as outlined herein below in more detail, a detector may also be embodied by a network switch or similar networking equipment.

The term "signal strength" as referred to herein, as well as grammatical variations thereof, relates to any value providing an indication of the intensity of an EM field and may be expressed in Watts or in power ratio of decibels of the measured power referenced to one milliwatt (dBm) or any other appropriate unit or indicative value.

In an embodiment, a method for monitoring usage of a functional facility may comprise detecting, by a detector located in the functional facility, an operable engagement that is made between the detector and a client device. Such operable engagement may include, for example, connecting a client device (e.g., laptop computer) with a LAN switch; docking client device onto a LAN connection, e.g., via a docking station; and/or the reception of a wireless signal emitted by a client device which is received, at a certain quality and for a minimum period of time, e.g., by an access point located in the functional facility. The method may then further include providing an output, which is descriptive of the detected operable engagement, along with location information relating to the detector. The output may be provided to an operator of the functional facility.

In some embodiments, the output may comprise identifying information of the client device whose presence is detected. Such data descriptive of client device identifying information may herein be referred to as "client device identifier" or "client device ID". The received client device ID may be associated with the detector location information.

In some embodiments, the output may comprise device location information. The device location information may be based on (e.g. inferred from) detector location information which detected the presence of the device.

At some instances, to simplify the discussion that follows, the terms "device location information" and "detector location information" may herein be collectively referred to as "location information".

Based on location information obtained over a period of time, values of parameters related to the usage of the facility may be provided to the operator, e.g., in real-time, for monitoring and analysis purposes. The term "real-time" as used herein may also encompass the meaning of the term "substantially in real-time".

According to some embodiments, a client device ID may be associated with data descriptive of respective user identifying information. Such data may herein be referred to as "user-ID". The method may in some embodiments comprise a procedure for anonymizing the client device ID to obtain anonymized user-ID prior to providing an output which is indicative of a usage of a functional facility to an operator of the system. Example anonymization procedures that may be employed are outlined herein below in more detail.

According to some embodiments, the system may comprise one or more sensors (e.g., employed by one or more detectors, respectively) for measuring a parameter which can indicate the presence of a client device in a functional facility. Responsive to measuring the parameter, at least one of the one or more sensors may produce a signal, which may be received and processed by a processor. The processed signal may indicate a distance of the client device from the selected at least one sensor. Based on the processed signal indicating the distance, the processor may generate an instruction to a controller for adjusting an orientation and/or location of the at least one sensor within the functional facility to improve sensor coverage.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The number of elements shown in the Figures should by no means be construed as limiting and is for illustrative purposes only. The figures are listed below

FIG. 16 shows an example snapshot image of the floor recorded at a third time of recordation.

Referring to FIGS. 1 and 2, a system which provides information relating to the usage of a functional facility 1000 is herein referenced by alphanumeric label "2000". Functional facility 1000 may have one or more floors, e.g., a first floor 1100, a second floor 1200, a third floor 1300 and a fourth floor 1400.

System 2000 may herein also be referred to as "monitoring system" or "facility monitoring system". Functional facility monitoring system 2000 may monitor facility usage based on detection and monitoring of the location of one or more computerized mobile client devices 2200 (e.g., first, second and third client devices 2200A-2200C) located on a first facility floor 1100. The one or more client devices 2200 may be associated with one or more respective users (not shown). In an embodiment, the one or more client devices 2200 may be considered to be comprised in monitoring system 2000.

Monitoring system 2000 may include one or more external detectors 2400 (e.g., detectors 2400A-2400H). The term "external detector", as used herein, may refer to any device, apparatus and/or system that is external to computerized client device 2200. Monitoring system 2000 may in some embodiments further include a usage monitoring server 2500. The term "external detector" as used herein may refer to a sensor that is external to a client device. Some of detectors 2400 may, for example, be comprised in or embodied by LAN connection and/or wireless access points. An access point may, for example, be operative to establish Macro-, Femto- or Pico-cells of wireless communication.

Figure 1:
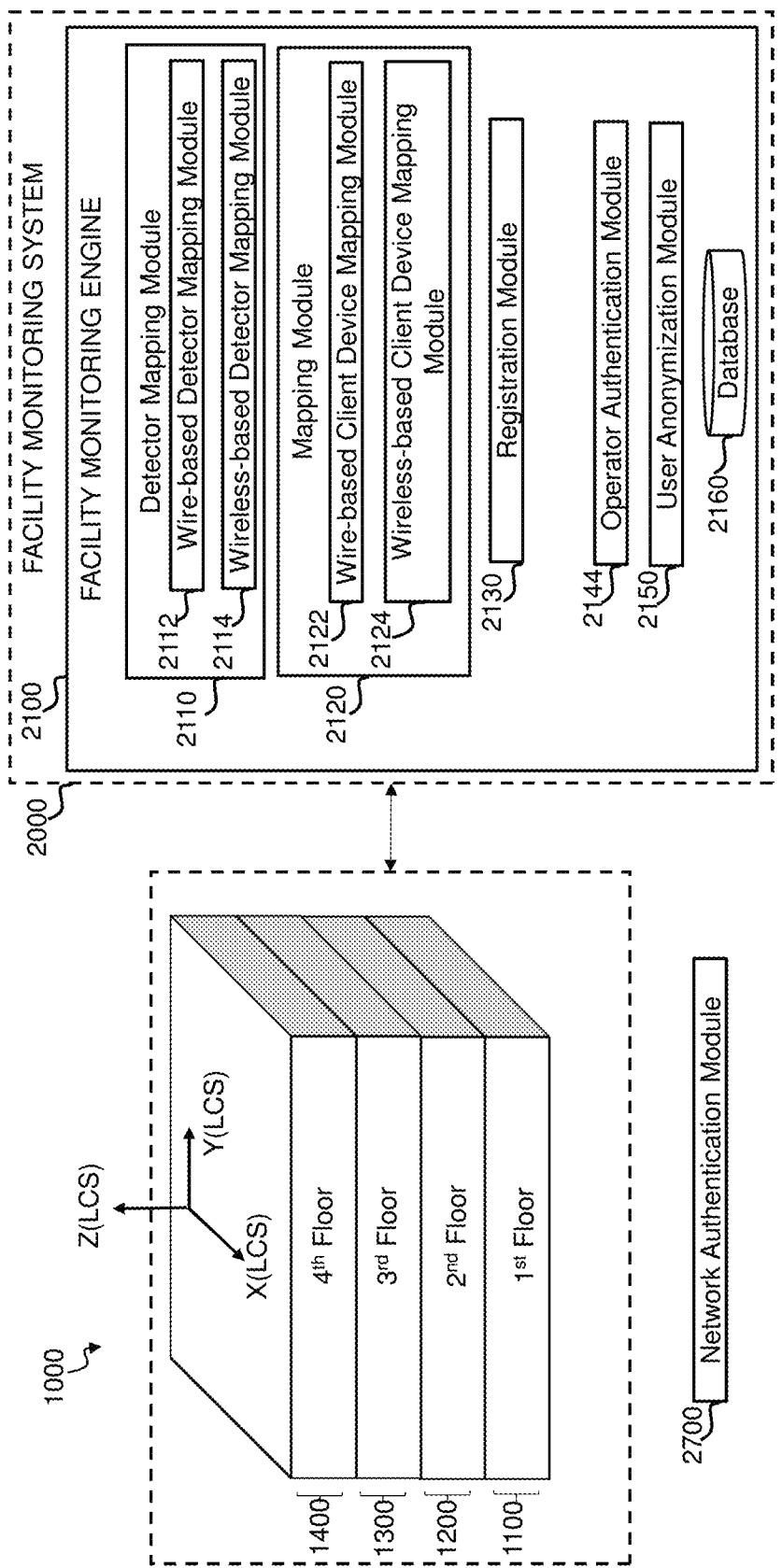
FIG. 1 shows a schematic isometric illustration of a functional facility (left side), and a schematic block diagram illustration (right side) of a system for monitoring the usage of the functional facility.
Figure 2:
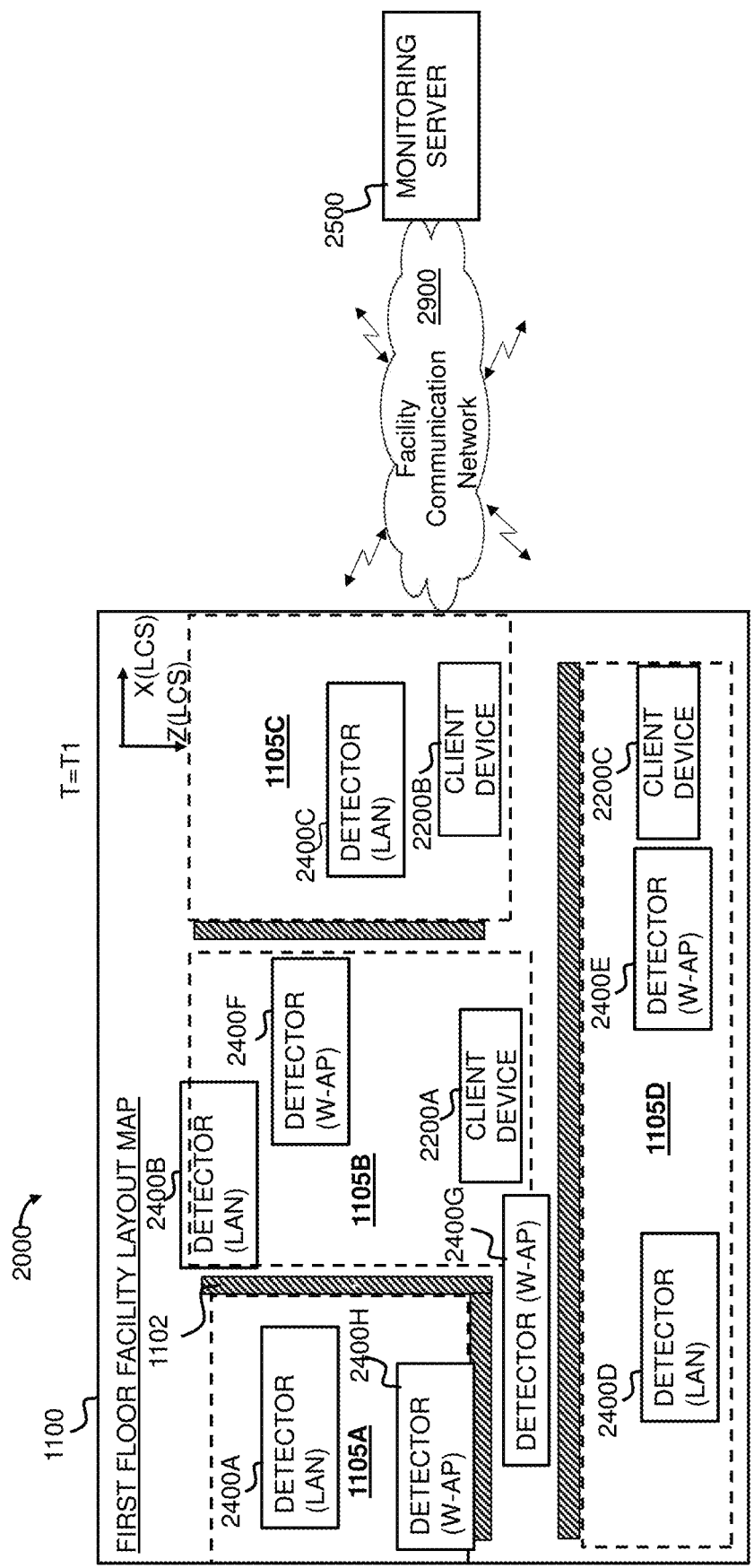
FIG. 2 shows a schematic plan view illustration of a floor of a functional facility, and the schematic block diagram illustration of the system for monitoring usage of the functional facility.

Parameters of functional facility 1000 may be mapped with reference to a local Cartesian coordinate system (LCS), schematically illustrated in FIGS. 1 and 2 by arrows X(LCS), Y(LCS) and Z(LCS) to obtain map information. Initial geographic facility information may be updated periodically or non-periodically (e.g., pseudo-randomly) and/or responsive to an input received by facility monitoring engine 2100 which is indicative of a change in a geographic parameter relating to functional facility 1000.

Non-limiting examples of geographic facility information may refer to and/or comprise floor level information (e.g., derived from a digital terrain map or DTM associated with the local coordination system; location of walls, windows, doors, stairs, escalators, elevators; parking area including; e.g., indication of the number of free parking lots and, optionally, of their location; the location of toilets, bathrooms and/or of business areas; the name of the companies occupying the business areas and/or the type of service and/or products offered in the business areas; the location of living areas, public and private spaces, maintenance areas and/or restricted areas; the location of emergency equipment, emergency exits; and/or the like.

Non limiting examples of geographic facility information may further refer to and/or comprise information about the location of product items in a retail store as well as pricing, product number and/or other information about the items. Such product items may, for example, include apparel, food products, stationary products and/or toys. In some embodiments, information about the location of point of sales (POS) of product items according to product categories may be mapped in functional facility 1000. For instance, the areas where sportswear and vegetables are offered for sale may be mapped in functional facility 1000. Optionally, the location of each particular product item may be mapped in functional facility 1000. For instance, the location of a particular brand of sport shoe and of a species of apples, optionally along with associated product pricing may be mapped in functional facility 1000 by the local coordinate system.

Moreover, geographic facility information may comprise and/or refer to, for example, location information descriptive of detectors 2400 and associated operating parameters including, for instance, a detector identifier, detector type, boundaries of "dead zones", which are not covered by detectors 2400, permanently or intermittently; operating range (e.g., wireless coverage area); detector location relative to the local coordinate system; sensitivity; range; precision; resolution; accuracy; linearity; response time; and/or the like.

The number of client devices 2200, external detectors 2400 and/or servers 2500 shown in the accompanying figures should by no means to be construed as limiting and is for illustrative purposes only. Correspondingly, the number of communication links as illustrated herein should by no means be construed as limiting and is for illustrative purposes only. Moreover, the arrows indicating a direction of flow of information over these links should not be construed as limiting.

Client device 2200, external detectors 2400 and usage monitoring server 2500 may communicate with each other over a communication network 2900. Communication network 2900 may be comprised in or added to a facility communication network that interconnects communication components serving facility 1000 and its users.

Using data provided by external detectors 2400, monitoring system 2000 may be operative to enable the implementation of methods, processes and/or operations for mapping the location of detectors 2400 in facility 1000 to obtain detector location information, which is respectively associated with detectors 2400. In an embodiment, mapping of detectors 2400 may be performed on a floor-by-a floor basis. The terms "mapping" and "geographically associating" may herein be used interchangeably.

Furthermore, monitoring system 2000 may be operative to enable the implementation of methods, processes and/or operations for detecting and tracking client devices 2200 that are located in facility 1000 using detectors 2400. For instance, responsive to detecting the presence of client device 2200A in facility 1000 by the one or more detectors 2400, monitoring system 2000 may be operative to detect, track client device 2200A, based on detector location information which is associated with the detector that detected the presence of client device 2200A.

The above noted methods, processes and/or operations for mapping the location(s) of detectors 2400 and for detecting, mapping and tracking of client devices 2200 located in facility 1000 using the geographically associated detectors 2400 may herein be implemented by a "Facility Monitoring Engine", which is schematically illustrated in FIG. 1 as a block referenced by alphanumeric label "2100". In an embodiment, facility monitoring engine 2100 may output a heat map which is indicative of the usage of areas in a functional facility during a time interval.

The term "engine" as used herein may also relate to and/or include a module and/or a computerized application. Facility monitoring engine 2100 may be realized by one or more hardware, software and/or hybrid hardware/software modules, e.g., as outlined herein. Clearly, the configuration of facility monitoring engine 2100 as outlined herein should by no means be construed as limiting and is therefore for illustrative purposes only. According to some embodiments, facility monitoring engine 2100 may, for example, comprise a detector mapping module 2110 and a mapping module 2120.

In embodiments, detector mapping module 2110 may store geographic location information of detectors 2400 along with an identifier of the detector(s) 2400.

In embodiments, mapping module 2120 may register the detection of a client device 2200 along with geographic facility information which is related to the geographic information that is associated with the detector(s) 2400 that detected the presence of the client device.

Detector mapping module 2110 may, for example, include a wire-based detector mapping module 2112 and a wireless-based detector mapping module 2114 for the geographic mapping of detectors 2400 with respect to their location in functional facility 1000. The data descriptive of the geographic mapping of detectors 2400 is stored in monitoring system 2000 as detector location information. Wire-based detector mapping module 2112 may, for example, allow the mapping of client devices 2200 located in functional facility 1000. Analogously, wireless-based detector mapping module 2114 may, for example, allow the mapping of wireless access points and/or of client devices 2200 in functional facility 1000.

According to some embodiments, once detectors 2400 are geographically mapped, mapping module 2120 may provide device location information, responsive to detecting the presence of a client device 2200 by detectors 2400. Mapping module 2120 may, for example, comprise a wire-based client device mapping module 2122 and/or a wireless-based client device mapping module 2124.

In some embodiments, facility monitoring engine 2100 may include a registration module 2130. Registration module 2130 may, for example, register (e.g., based on an identifier received from a client device 2200 at one or more detectors 2400) ingress and egress of client device 2200 into/from functional facility 1000.

In some embodiments, registration module 2130 may store data descriptive of identifiers of client devices 2200 that are approved for use in conjunction with facility monitoring system 2000, e.g., by a system administrator.

In some embodiments, a network authentication module 2700 may be employed which is operative to authenticate client devices that attempt to communicably connect with system components of communication network 2900. Network authentication module 2700 may for example comprise an identity service engine (ISE) for verifying eligibility of users to access network 2900. After authenticating a client and/or its user, a network authorization phase may be invoked by network authentication module 2700 defining what network resources the authorized user can access.

In some embodiments, facility monitoring engine 2100 may include an operator authentication module 2144 for verifying operator eligibility to use monitoring engine 2100. After authentication, an operator authorization phase may be invoked by operator authentication module 2144 defining what facility monitoring engine resources the authorized operator can access In some embodiments, facility monitoring engine 2100 may include an anonymization module 2150 for protecting the privacy of the users that are associated with the client devices 2200.

Generally, the presence of a client device 2200 at a particular geographical location in facility 1000 may be detected responsive to the operable engagement of a client device with any one of detectors 2400 located in facility 1000. Detecting operable engagement may, for example, comprise detecting a communication connection made between the client device with a wired and/or wireless local area network (LAN) that is geographically associated with functional facility 1000; detecting the connection of a client device 2200 with a LAN switch located in the functional facility; the connection of a client device 2200 with another client device that is operable engaged with a detector 2400 of functional facility 1000 (e.g., a client device which is connected to a desktop computer via a USB cable); detecting a client device 2200 connecting with the facility's electrical hook-up (not shown), and/or the like.

Generally, detectors 2400 are deployed throughout functional facility 1000. For instance, each personal desk (not shown) and each meeting room desk (not shown) may be equipped with a LAN connection 2920, which may act as (or comprised in) detectors 2400. Furthermore, a plurality of access points may be deployed in functional facility 1000 such to ensure a certain minimal signal reception at least in those areas of the facility, which are expected to be regularly frequented by users. In some embodiments, jamming devices may be deployed in functional facility 1000 in areas where cellular communication would be considered disruptive (e.g., in sanitary areas). In some embodiments, such jamming devices may also act as client device detectors 2400.

As shown schematically in FIG. 2, an example layout of first facility floor 1100 may accommodate offices which may be divided by walls 1102, e.g., creating various distinct floor areas 1105A-1105D, schematically indicated by broken lines. Areas 1105A and 1105B may, for example, serve as workspaces (e.g., comprising personal workspaces or meeting rooms), area 1105C may, for example, comprise sanitary rooms, and area 1105D may comprise kitchen and dining room facilities.

Figure 3:
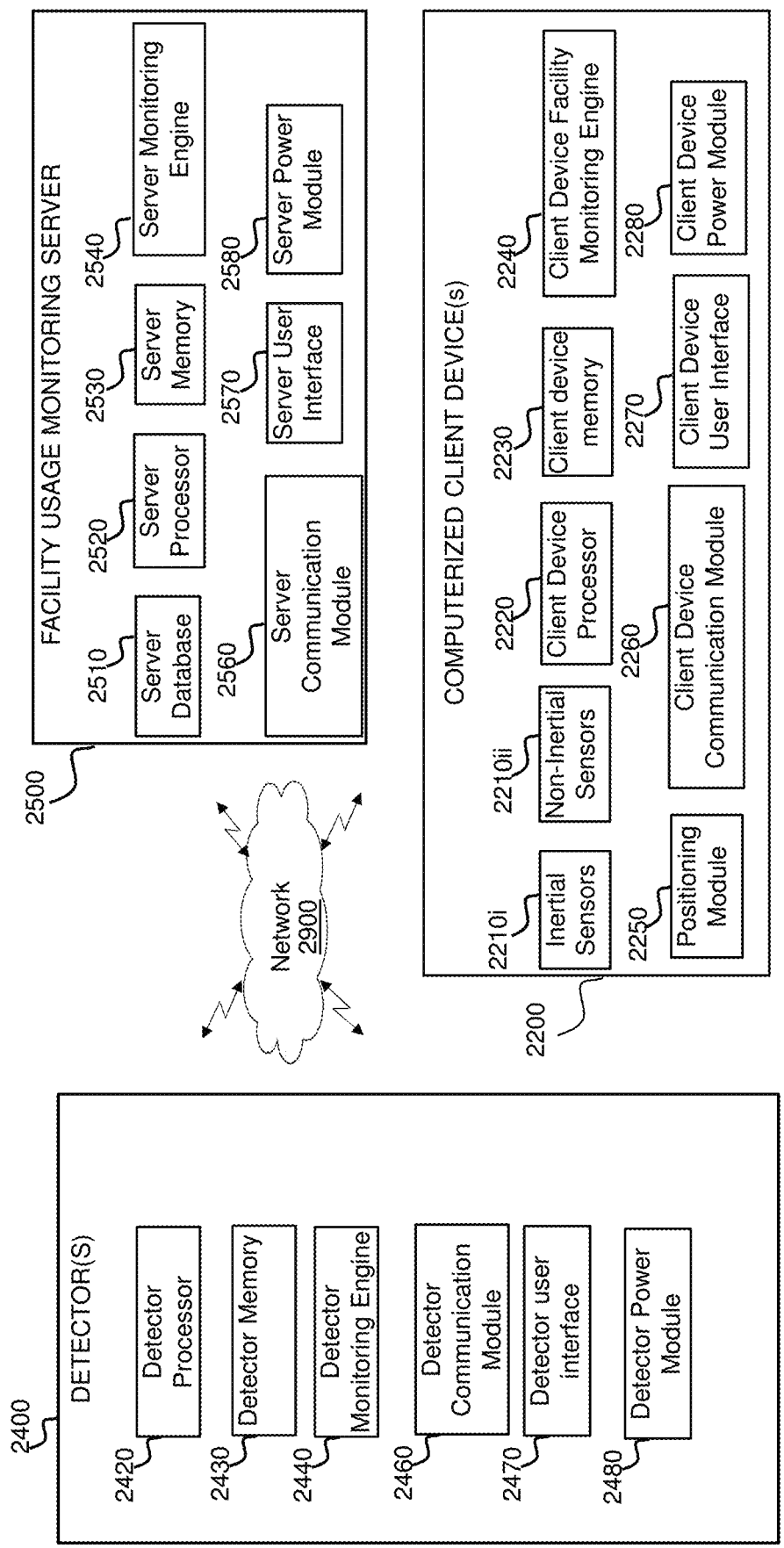
FIG. 3 shows a schematic block diagram illustration showing the components of a client device, a detector, and a monitoring server of the system.

Additional reference is now made to FIG. 3. A computerized client device 2200 may in some embodiments include one or more inertial sensors 2210$i$ and non-inertial sensors 2210$ii$, a client device processor 2220, a client device memory 2230, a client device navigation engine or positioning module 2250, a client device communication module 2260, a client device user interface 2270, and a client device power module 2280 for powering the various components and/or application engines and/or modules of computerized client device 2200.

Although not specifically illustrated in FIG. 3, in the discussion outlined herein, components of computerized client devices 2200A-2200C may be indicated with respective labels "A", "B" and "C". For example, client device processor 2220A, client device processor 2220B and client device processor 2220C indicate that these components are included in client devices 2200A, 2200B and 2200C, respectively.

A detector 2400 may in some embodiments include a detector processor 2420, a detector memory 2430, a detector monitoring engine 2440, a detector communication module 2460, a detector user interface 2470 and a detector power module 2480 for powering the various components of detector 2400.

Facility usage monitoring server 2500 may in some embodiments include a server database 2510, a server processor 2520, a server memory 2530, a server monitoring engine 2540, server communication module 2560, a server user interface 2570, and a server power module 2580 for powering the various components and/or application engines or modules of navigation server 2500.

The various components of the one or more client devices 2200, detectors 2400 and/or monitoring server 2500 may communicate with each other over one or more communication buses (not shown) and/or signal lines (not shown).

Inertial sensor 2210$i$ may include, for example, one or more accelerometers and/or gyroscopes. Non-inertial sensors 2210$ii$ may include, for example, one or more barometers, proximity sensors, altimeters, magnetometers, light sensors, touch screen sensors, receivers of a Global Positioning System, and/or a front and/or back camera.

Client device memory 2230, detector memory 2430 and/or server memory 2530 may include one or more types of computer-readable storage media. For example, client device memory 2230, detector memory 2430 and/or server memory 2530 may include transactional memory and/or long-term storage memory facilities and may function as file storage, document storage, program storage, and/or as a working memory. The latter may, for example, be in the form of a static random access memory (SRAM), dynamic random access memory (DRAM), read-only memory (ROM), cache or flash memory. Long-term memory, client device memory 2230, detector memory (not shown) and/or server memory 2530 may, for example, include a volatile or non-volatile computer storage medium, a hard disk drive, a solid state drive, a magnetic storage medium, a flash memory and/or other storage facility. A hardware memory facility may, for example, store a fixed information set (e.g., software code) including, but not limited to, a file, program, application, source code, object code, and the like. As working memory, client device memory 2230 and/or server memory 2530 may, for example, process temporally-based instructions.

Client device communication module 2260, detector communication module 2460 and server communication module 2560 may, for example, include I/O device drivers (not shown) and network interface drivers (not shown) for enabling the transmission and/or reception of data over network 2900. A device driver may, for example, interface with a keypad or a USB port. A network interface driver may, for example, execute protocols for the Internet, or an Intranet, Wide Area Network (WAN), Local Area Network (LAN) employing, e.g., Wireless Local Area Network (WLAN)), Metropolitan Area Network (MAN), Personal Area Network (PAN), extranet, 2G, 3G, 3.5G, 4G including for example Mobile WIMAX or Long Term Evolution (LTE) advanced, Bluetooth®, ZigBee™, near-field communication (NFC) and/or any other current or future communication network, standard, and/or system.

Server 2500 may refer, for example, to one or more servers or storage systems and/or services associated with a business or corporate entity, including for example, a file hosting service, cloud storage service, online file storage provider, peer-to-peer file storage or hosting service and/or a cyberlocker.

The term "processor", as used herein, may additionally or alternatively refer to a controller. A processor such as for example client device processor 2220 and/or server processor 2520 may be implemented by various types of processor devices and/or processor architectures including, for example, embedded processors, communication processors, graphics processing unit (GPU)-accelerated computing, soft-core processors and/or embedded processors.

Facility monitoring engine 2100 may be implemented by any suitable device, fully or partially. For example, implementations and/or processes and/or elements and/or functions of facility monitoring engine 2100 may be implemented by client device(s) 2200, detector(s) 2400 and/or by monitoring server 2500. Respective implementations and/or processes and/or elements and/or functions of facility monitoring engine 2100 are herein referenced by labels 2240, 2440 and 2540, denoting "client device monitoring engine", "detector monitoring engine" and "server monitoring engine", respectively, causing facility monitoring system 2000 to operate as disclosed herein. For instance, client device memory 2230, detector memory 2430 and/or server memory 2530 may include instructions which, when executed e.g. by the respective client device processor 2220, processor (not shown) of detector 2400, and/or server processor 2520, may cause the execution of a monitoring method, process and/or operation. Merely to simplify the discussion that follows, methods and processes disclosed herein may herein be discussed in conjunction with facility monitoring engine 2100. One or more hardware, software, and/or hybrid hardware/software modules may realize monitoring engine 2100.

Figure 4:
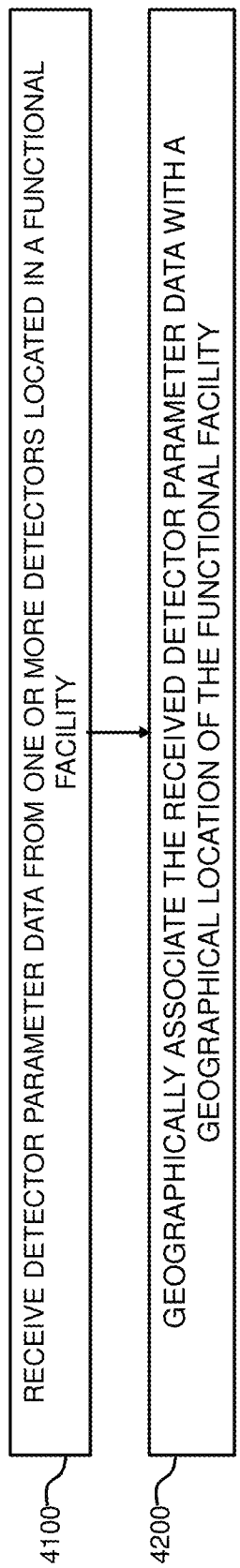
FIG. 4 shows a flow chart of a method for geographically mapping detectors in a functional facility.

Additional reference is now made to FIG. 4. In an embodiment, a method for geographically mapping a detector in a functional facility may include, as indicated by step 4100, receiving detector parameter data from one or more detectors that are located in the functional facility. The method may further include, as indicated by step 4200, geographically associating the received detector parameter data with a geographical location of the functional facility.

Example procedures of geographically mapping a detector are outlined herein below in more detail.

Figure 5:
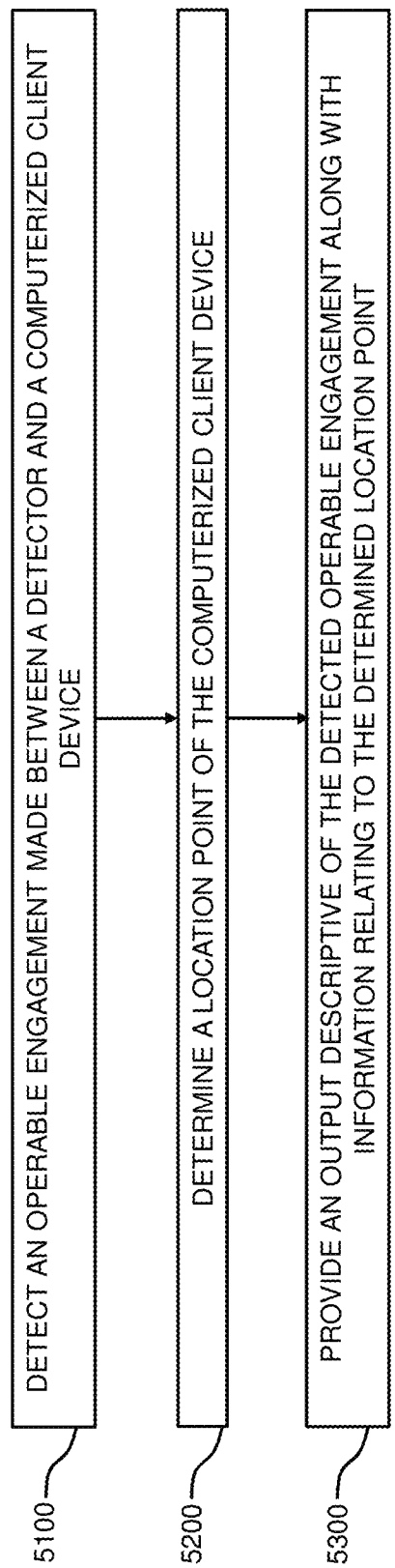
FIG. 5 shows a flow chart of a general method for geographically mapping computerized client devices in a functional facility.

Further referring to FIG. 5, a method for geographically mapping a client device may include, as indicated by step S100, detecting by a detector located and geographically mapped with respect to the functional facility, an operable engagement that is made between a detector and a computerized client device.

In an embodiment, the method may include, as indicated by step S200, determining a location of the computerized client device.

In an embodiment, the method may include, as indicated by step S300, providing an output descriptive of the detected operable engagement along with information relating to the determined location point. The location point of the client device is determined based on location information of the detector. Example procedures of geographically mapping a client device are outlined herein below in more detail.

Figure 6:
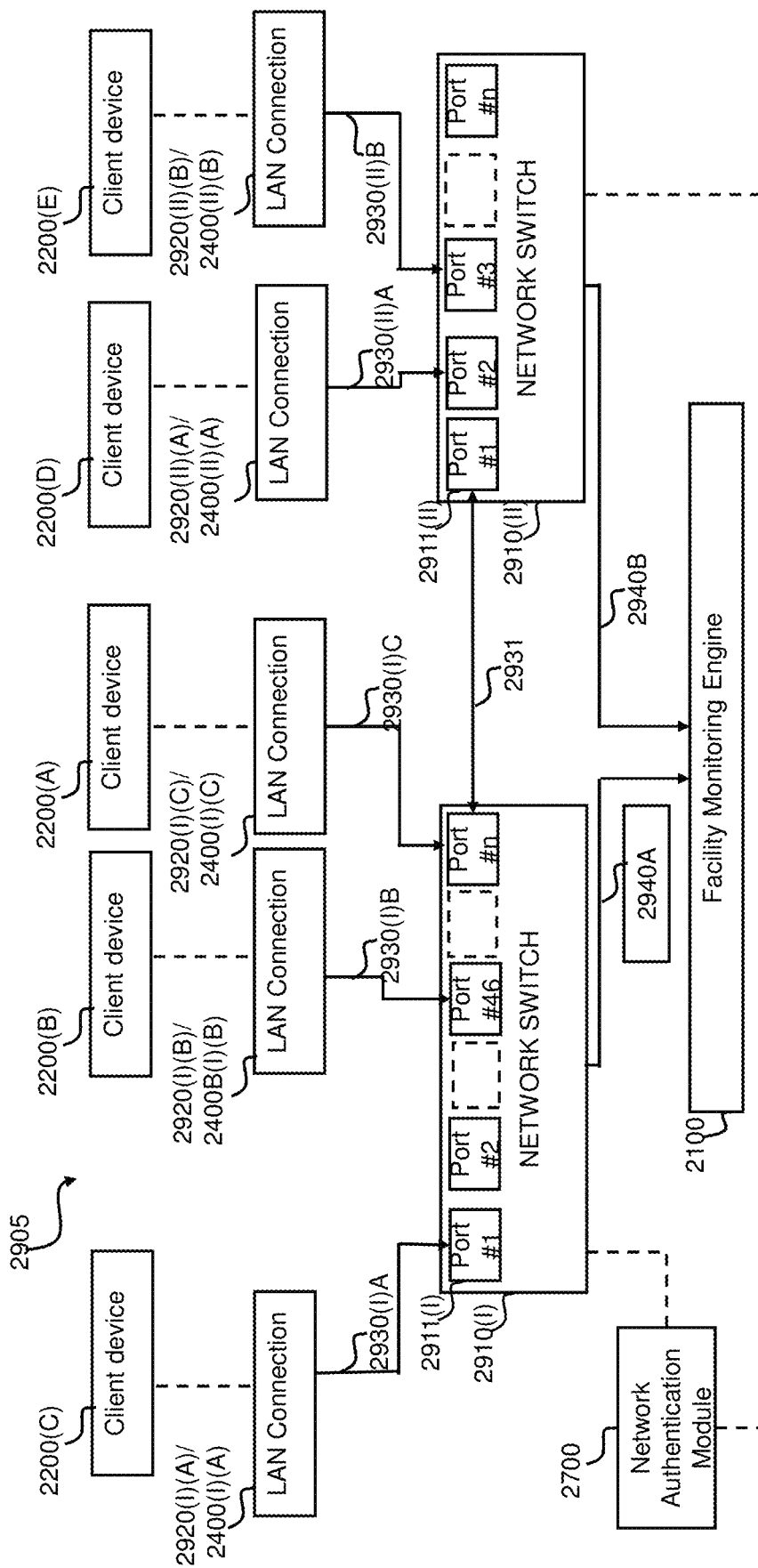
FIG. 6 shows a schematic illustration of a local area network topology.

Wire-based mapping of detectors is discussed with respect to an example LAN network topology 2905 which is schematically illustrated in FIG. 6 and which may be employed by communication network 2900. A communication network 2900 may in some embodiments comprise one or more network switches 2910, e.g. for communicably associating detectors 2400 (e.g. LAN connections 2920) with monitoring engine 2100 via communication links 2930 and respective ports 2911. As already indicated herein, such LAN connections 2920 may, for example, comprise or embody some of detectors 2400. It is noted that some parts of communication links 2930 and/or 2940 may be implemented wirelessly.

A first network switch 2910(I) may, for example, be communicably coupled with a first set of LAN interfaces 2920(I)(A)-2920(I)(C) and a second network switch 2910 (II) may be communicably coupled with a second set of LAN interfaces 2920(II)(A)-2920(II)(B). The respective operative association or coupling between a network switch and a set of LAN interfaces is herein indicated by reference numerals within round brackets.

In an embodiment, the LAN interfaces of a given set, e.g., of docking stations which are communicably coupled with the same network switch, may be deployed on the same floor. For instance, LAN connections 2920(I)(A)-2920(I)(C) of first network switch 2910(I) may be located on first facility floor 1100, and LAN connections 2920(II)(A)-2920(II)(B) may be deployed on second facility floor 1200.

In an embodiment, two or more network switches may be communicably coupled with sets of LAN connections that are located on the same floor. For example, LAN connections 2920(I)(A) to 2920(I)(B) of first network switch 2910 (I) and LAN connections 2920(II)(A)-2920(II)(B) of second network switch 2920(II) may be located on the same facility floor 1300.

In an embodiment, LAN connections which are coupled with the same network switch may be located on different facility floors. For instance, LAN connection 2920(II)(A) may be located on first facility floor 1100, and LAN connection 2920(II)B may be located on fourth facility floor 1400.

The location mapping of detectors 2400 comprised in or embodied by client LAN interfaces or LAN connections 2920, may be performed by wire-based detector mapping module 2112, e.g. as outlined herein.

Figure 7:
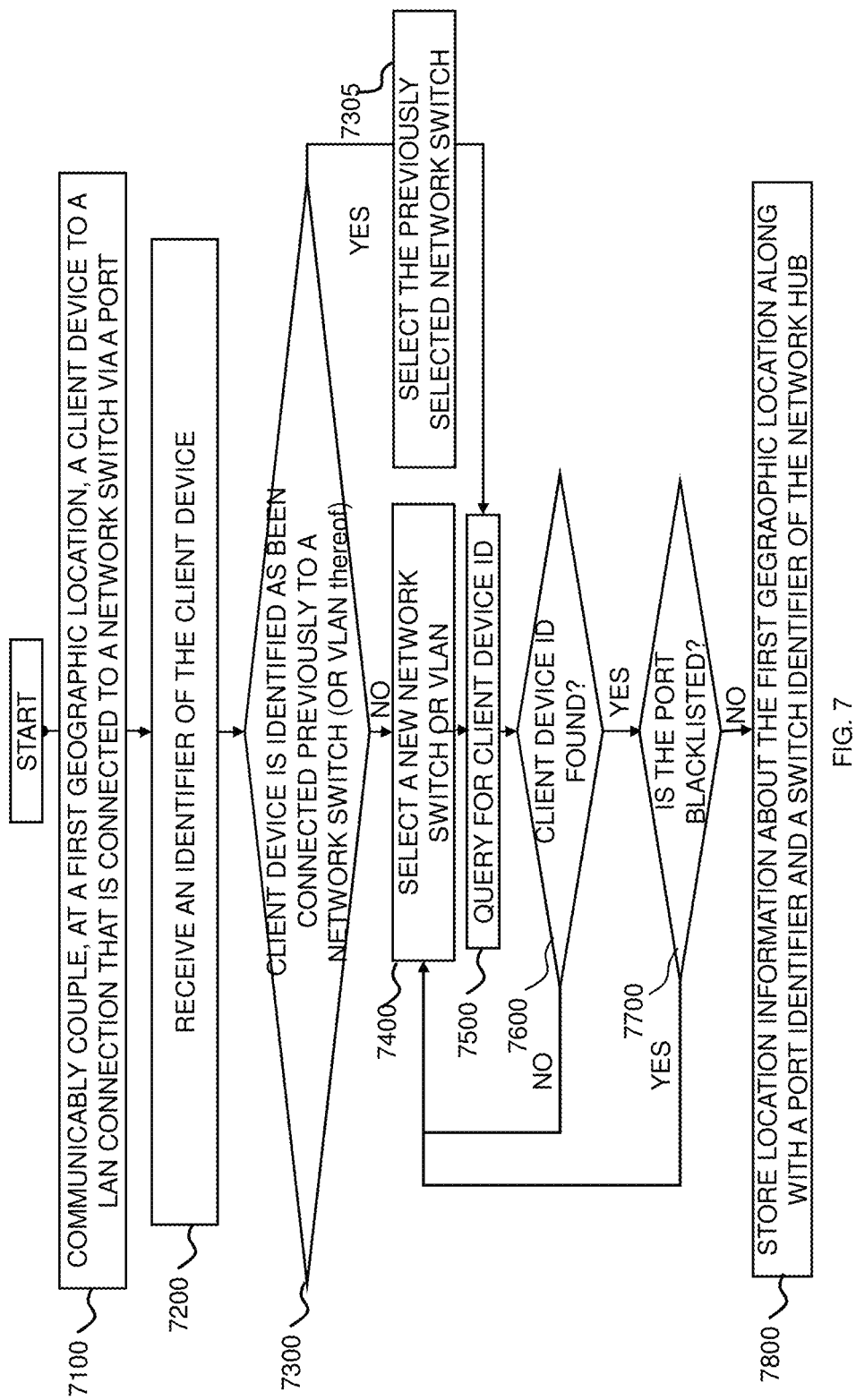
FIG. 7 shows a flow chart of a method for mapping detectors in a functional facility.

Referring to FIG. 7, the mapping of a LAN connection 2920 with a port of a network switch may include in some embodiments, as indicated by step 7100, communicably coupling, at a first geographic location, a client device to a LAN connection that is communicably coupled with a network switch via a port. In an embodiment, the port may be associated with one of a plurality of VLANs which are associated with the given network switch. The client device may have an authorized and, optionally known, device identifier. For example, client device 2200A may be communicably coupled with a first port 2911(I)(A) of first network switch 2910(I). Client device 2200A may, for example, be communicably coupled with first network switch 2910(I) by connecting client device 2200A, to a LAN connection, e.g., via a docking station. A client device identifier may be, for example, the Media Access Control (MAC) Address of the device. Further data that may be received from a client device may be descriptive of the client device certificate name, username, organizational unit affiliation, team affiliation and/or the like. Optionally, Username, organizational unit affiliation, team affiliation and MAC address may be used for inventory purposes, for example, to identify the users.

As indicated by step 7200, the mapping method may, in an embodiment, further include receiving an identifier of the client device (e.g. "0xAA"). For example, a client device identifier may be received by monitoring system 2000 (e.g. by wire-based detector mapping module 2112). For instance, the client device identifier may be fetched or provided. In an embodiment, information descriptive of the first geographic information may be received by system 2000 (e.g. by wire-based detector mapping module 2112). For example, the first geographic location information may be provided by an administrator of monitoring system 2000.

In some embodiments, the mapping method may include, querying all network switches and, if applicable, the VLANs associated with the network switches, to determine which port of the network switches is currently communicably coupled with the client device (e.g., device 2200A) employed for conducting the mapping procedure. If for example a match is found between the ID of device 2200A and a port, the port is mapped with the geographic location of the LAN connection 2920 (or the corresponding desk) to which device 2200A is connected. The same procedure may then be repeated for the next LAN connection 2920.

In some other embodiments, caching or a caching procedure may be employed for mapping ports of network switches with LAN connections 2920, as exemplified herein below in more detail.

As indicated by box 7300, the mapping method which employs caching may include, in an embodiment, determining if the client device with known and authorized identifier information is identified as having previously been connected to a LAN network entity (which comprises the port) or not. Such LAN network entity may comprise a given network switch and, optionally, a given VLAN of a plurality of VLANs that are associated with the given network switch.

For example, in order to map a port of a VLAN with the location of the LAN connection, wire-based detector mapping module 2112 may first determine if client device 2200A had already once been connected before with the given network switch and the given VLAN in a preceding mapping procedure, or not. If the result of the latter procedure is that client device 2200A was once connected with the given network switch and the given VLAN thereof in a preceding mapping procedure, then only the ports of same given VLAN may be queried (step 7305). If, responsive to the querying, the ID of client device 2200A is found to be associated with one of the ports of the given VLAN, the said port is mapped with the LAN connection 2920 to which client device 2200A is currently connected to.

On the other hand, if the ID of client device 2200A is not found to be associated with one of the ports of the given VLAN, then all VLANs or, optionally, the not-yet queried VLANs, of the given network switch may be queried (steps 7400 & 7500). If, responsive to said querying, the ID of client device 2200A is found to be associated with one of the ports of any of the VLANs of the given network switch, then said port is mapped with the respective LAN connection 2920 (steps 7600 & 7800). Step 7800 is outlined in more detail further below. If no match is found between a port and the ID of client device 2200A, then all VLANs of all switches may be queried until such match is found (steps 7400 & 7500).

Some VLAN identifiers may be blacklisted (not read) and some whitelisted. Whitelisted VLAN identifiers (or simply VLANs) may be queried in the LAN connection mapping procedure, whereas blacklisted VLANs may not be queried.

In an embodiment, a step of authenticating a client device may be performed by network authentication module 2700 which is operative to authenticate client devices that attempt to communicably connect with system components of communication network 2900. In an authentication procedure, may receive a client device identifier which may be connected with communication network 2900 in a vetting mode. If the received client identifier meets a matching criterion with data descriptive of approved client device identifiers, the respective client device may be authenticated. In turn, the client device may then be authorized to communicably connect with system components of communication network 2900 in an authenticated mode. Clearly, different levels of authorization may be associated with different client devices 2200. Additional or alternative measures may be employed to prevent unauthorized access of client devices to communication network 2900. Network authentication module 2700 may, for example, employ wireless protocol IEEE 802.1X on network 2900, e.g., by Cisco® Identity Service Engine (ISE) and/or any known or future communication protocol. In an embodiment, client device identifiers may be readout by employing an application programming interface (API). Example APIs include representational state transfer (REST), and simple network management protocol (SNMP).

In some embodiments, prior to associating or mapping a port with a LAN connection, it may be checked if the port is blacklisted (step 7700). In other words, the method may further include, as indicated by step 7700, determining if the port of the network switch to which the client device is connected, is "blacklisted". A port may be considered "blacklisted" if it is already employed or reserved for connecting a component to the network switch and, therefore, is not available for connection with a client device. For example, port #n of first network switch 2910(I) and port #1 of second network switch 2910(II) may be blacklisted as they are in use for communicably coupling first network switch 2910(I) with second network switch 2910(II), e.g. via communication link 2931.

In case the port for which the device ID was found is not blacklisted, the method may, in an embodiment, include, as indicated by step 7800, storing in system 2000 information which is descriptive of the first geographic information in association with data descriptive of the port. For example, the geographic information may be the location of a desk or room, which is geographically mapped in system 2000, and the corresponding LAN connection. Optionally, a LAN connection identifier may be stored in association with the first geographic location information. Optionally, the VLAN which is associated with the port of the network switch is stored in association with the geographic location information.

Optionally, a time stamp may be stored in association with the first geographic information which is stored in association with the identifiers of the network switch and port. The time stamp indicates a time of recordation of the geographic association of the port(s) or detector(s). Prior to reconfiguring network 2900 differently, which may result in changing a first geographic mapping to a second, different geographic mapping, another time stamp of recordation may be associated with the ports prior to such network reconfiguration. Hence, geographic location information of a detector may be attributed with a start and an end time defining the time period during which the detector's geographic mapping was valid.

In an embodiment, the method may include repeating steps 7100-7800 at the next geographic location which features an arrangement for communicably coupling a client device to a network switch of functional facility 1000.

Figure 8:
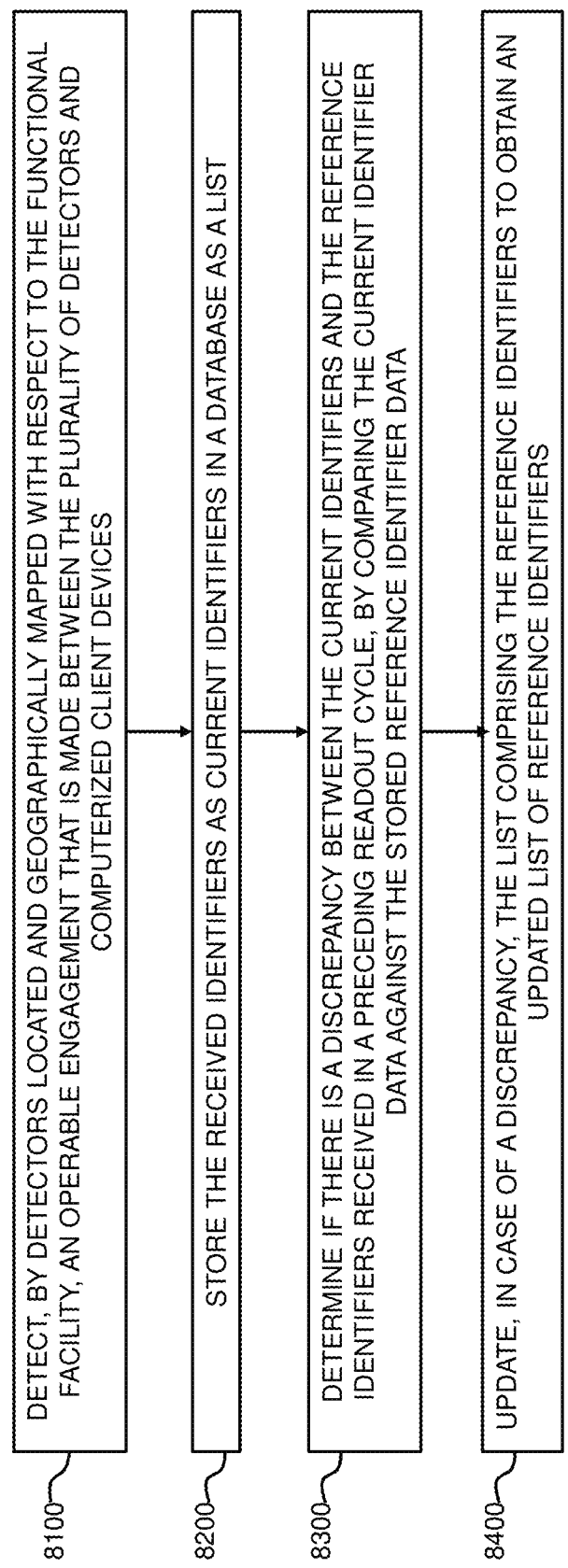
FIG. 8 shows a flow chart of a method for geographically mapping client devices using wire-based LAN connections.

Further reference is made to FIG. 8 which illustrates a flow chart of a method for geographically mapping client devices using wire-based LAN connections. Such method may include, as indicated by step 8100, detecting by detectors located and geographically mapped with respect to the functional facility, an operable engagement that is made between the plurality of detectors and computerized client devices. In an embodiment, the step of detecting such operable engagement may comprise or may be followed by reading an identifier respective of the plurality of detected client devices and of the corresponding network switch (and optionally, of corresponding VLAN lists) along with the respective port identifier. For instance, referring to FIG. 6, responsive to detecting a communicable connection of client device 2200D with LAN interface 2920(I)(B), wire-based client device mapping module 2122 may receive (e.g. through readout or fetching) identifiers of client device 2200E, LAN interface 2920(I)(B), of first network switch 2911(I) and of port #46. As an alternative to receiving an identifier of network switch 2911(I), wire-based client device mapping module 2122 may receive (e.g. read) VLAN lists.

As already indicated herein, a client device identifier may be, for example, the Media Access Control (MAC) Address of the device. Optionally, the client device identifier may be descriptive of the client device certificate name, username, organizational unit affiliation, team affiliation and/or the like. Optionally, Username, organizational unit affiliation, team affiliation and MAC address may be used for inventory purposes, for example, to identify the users.

Identifiers which are received in a present readout procedure of step 8100 may herein be referred to as "current identifiers". In an embodiment, the method may include, as indicated by step 8200, storing the received identifiers as current identifiers in a database 2160. Database 2160 may, for example, be embodied (e.g. fully or partially) by server database 2510 of monitoring server 2500.

The method may include, as indicated by box 8300, determining if there is a discrepancy between the current identifiers and identifiers (herein: "reference identifiers") which were received in a preceding readout cycle, by comparing the current identifiers against the reference identifiers. The method may further include, as indicated by box

8400, updating the list of reference identifiers to obtain an updated list of reference identifiers, in case of a discrepancy.

Comparing the current identifiers against reference identifiers and updating the list of reference identifiers may, for example, be accomplished as follows. Each reference identifier may, for example, be tagged as «New», «Last Seen» and with time stamps named «Start Time», or «End Time» from a network switch. According to some embodiments, such trigger may override a periodic readout cycle.

Each addition and/or change of recordation in an entry of the list of identifiers entry may be associated with a time stamp.

An example Pseudocode Implementation of method steps 8100-8400 is outlined herein below:

```
Input A: List of CAM Entries from Switch (CAM Entry: MAC Address + Port)
Input B: List of measurements from database for this switch (MAC Address + Port)
Input: Currently selected network
Function compare And Update Measurements:
    1. For each Switch Port
        1. Get all entries from list A for this port
        2. Get all entries from list B for this port
        3. Combine the two lists and extract all MAC Addresses
        4. For each MAC Address
            1. If MAC Address seen in switch list (A) and database list (B)
                1. Then: update time of «Last Seen» in the measurement from list B (optional
                   step)
                2. Continue with next MAC Address
            2. If MAC Address seen only in switch list (A):
                1. Then: create new measurement (Switch Port, MAC Address, start time=
                   current time)
                2. Continue with next MAC Address
            3. If MAC Address seen only in database list (B):
                1. Then: update «End Time» in the measurement from list B (set to current
                   time)
                2. Continue with next MAC Address
    2. Save all new and updated measurements in database
End Function
``` which indicate times of recordation of wireless and/or wire connection start and end times. For instance, in a first scenario, a current client identifier that is not yet listed in the list of reference identifiers may be added to the said reference identifier list and tagged as «New». For example, the identifier of client device 2200C may be listed as «New» if its identifier was not recorded in any of the previous cycles. It should be noted that terms "recorded" and "registered", as well as grammatical variations thereof, may herein be used interchangeably.

In a second scenario, if there is a match between a reference identifier and one of the current identifiers, the said reference identifier may be tagged as «Last Seen» in the list. In other words, a reference identifier may be tagged as «Last Seen», if the reference identifier was recorded in the previous readout cycle and a matching current identifier was found in the current readout cycle. For example, the identifier of client device 2200A may be tagged as «Last Seen» if it was already identified as registered (listed) in the readout cycle which precedes the current readout cycle.

In a third scenario, if for a previously readout (reference) client identifier no matching current client identifier is found, the said reference identifier may be associated with an «End Time». For example, the identifier of client device 2200C may be associated with a corresponding «End Time», if the identifier was registered in the preceding readout cycle, yet no matching identifier was found therefor in the current readout cycle. In other words, an «End Time» may be associated with an identifier is which is the time of recordation of the current readout at which, the client "disappeared".

Figure 9:
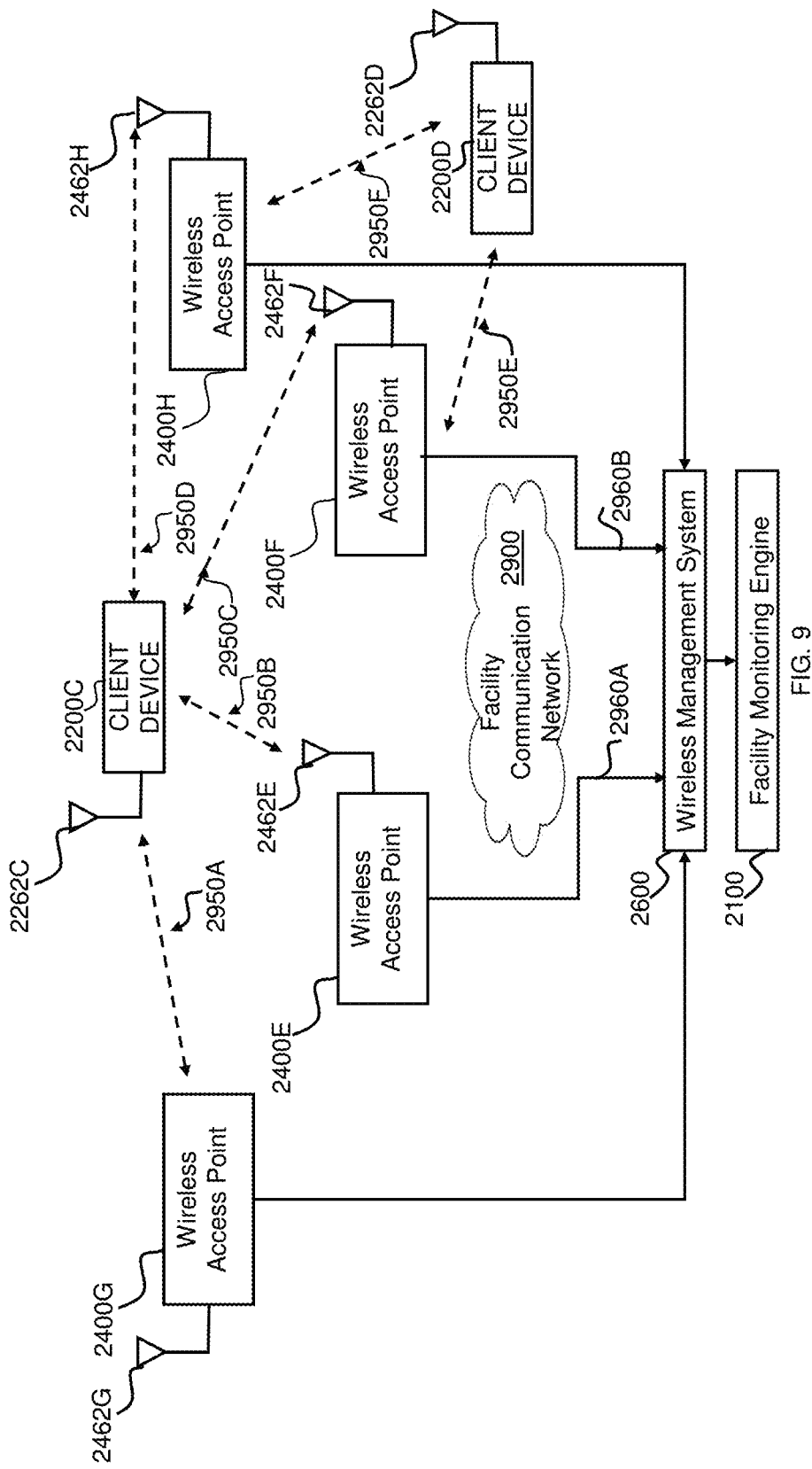
FIG. 9 shows a schematic block diagram illustration of a wireless communication system deployed in a functional facility.

According to some embodiments, readout for checking occupancy may be triggered periodically, e.g., every 5 minutes, 6 minutes or 10 minutes. According to some embodiments, readout for checking occupancy may be triggered responsive to a notification received from a component of system 2000, e.g., responsive to an input received Reference is now made to FIG. 9, which schematically illustrates a block diagram illustration of a wireless communication system deployed in a functional facility. As already mentioned herein, detectors may be embodied or comprised in wireless access points. Wireless access points may be employed in wireless-based client device mapping in a functional facility. Merely to simplify the discussion that follows, a detector having wireless communication capabilities may herein be referred to as "wireless access point". Accordingly, detectors 2400E-2400H may herein also be referred to as wireless access points 2400E-2400H.

A client device may communicate with access points over wireless communication links 2950, schematically illustrated herein by broken lines. Access points may communicate with facility monitoring engine 2100 over communication links 2960, which may be implemented by wire and/or wireless communication.

Wireless access points 2400 may each comprise one or more antennas 2462 allowing wireless communication with client devices 2200 via antennas 2262, which may be part of the client device communication module 2260.

The term "antenna", as used herein, may include any suitable configuration, arrangement and/or configuration of one or more antenna elements, components, units, assemblies and/or arrays.

In an embodiment, wireless access points 2400E-2400H may be geographically mapped with respect to functional facility 1000 and stored as location information in system 2000.

In an embodiment, wireless-based client device mapping module 2124 may employ various techniques for estimating a location of one or more client devices, based on various measured values of electromagnetic (EM) radiation parameters received at the access points from the client devices. These location estimation techniques may, for example, be employed periodically or in a non-periodic manner (e.g. pseudo-randomly) by monitoring engine 2100.

Such EM radiation parameters may, for example, include received signal strength (RSS), signal time-of-flight, phase difference, and/or the like. Measured values of parameters may be employed in trilateration and/or triangulation techniques for estimating the location of a client device. Location estimation may be performed by employing optimization techniques such as, for example, a Non Linear Model Fit.

A location of client device 2200C may, for example, be estimated based on the RSS values measured at two or more access points 2400E-2400H and which are provided or reported as received signal strength indications (RSSI) to facility monitoring engine 2100. Wireless-based client device 2124 (FIG. 1) may, for example, estimate the location of client device 2200C based on parameter values of the EM radiation that is emitted by client device 2200C and based on parameter values of the EM radiation received by the one or more access points 2400E-2400H and which originated from the same client device 2200C. In some embodiments, EM parameter values may be provided to monitoring engine 2100 in association with respective client device and access point identifiers. For example, wireless-based client device mapping module 2124 may receive values (e.g., RSSI values) related to one or more parameters of EM radiation emitted by client device 2200C and which are received by one or more wireless access points (W-APs) 2400E-2400H in respective association with an identifier of client device 2200C and the one or more access points 2400E-2400H. Estimated client device location points may be stored in system 2000 (e.g., in database 2160) as client device location information. Further, time stamps (e.g., T1(client device 2200D), T2(client device 2200D), . . . , Tn(client device 2200D)) may be associated with the estimated client device location points for indicating a time of recordation of the location points and stored in system 2000.

In some embodiments, EM radiation may be received at access points (e.g., 2400E-2400H) passively. More specifically, some access points, while not participating in establishing and maintaining a communication link, may receive signals related to such link.

According to some embodiments, access points (e.g., access points 2400E-2400H) may be operably associated (e.g., communicably coupled) with one or more Wireless Management Systems 2600. Non-limiting examples of such Wireless Management Systems include Cisco® Wireless LAN Controller, Cisco® Prime Infrastructure, and Cisco® Mobility Services Engine (not shown). Accordingly, in some embodiments, monitoring engine 2100 may receive (e.g., read) processed EM radiation parameter values which are related to EM radiation emitted by client device 2200, from such Wireless Management System(s) (not shown).

According to some embodiments, monitoring engine 2100 may apply a wireless client device filter logic on information that is wirelessly received at access points from a plurality of client devices. The wireless client device filter logic may be employed for determining for which of the plurality client devices a location shall be estimated by facility monitoring engine 2100 based on values related to EM radiation received at the access points from the corresponding device. Accordingly, by applying the client device filter logic, a selection of client devices is made from the plurality of client devices. Applying the wireless client device filter logic may for example return no client devices or one or more of the plurality of client devices. In other words, the wireless client device filter logic employed by monitoring engine 2100 may determine whether the received information respective of the wireless client devices meets a "location estimation criterion" or not. The location estimation criterion may, for example, relate to one or more of the following parameters: service set identifier (SSID); building location (e.g., in cases where the same SSID is associated with office buildings of a given company and which are located at different locations); minimum time period at which EM radiation is received; and/or authentication information received at the access points from the client devices. For example, EM radiation carrying information emitted by client device 2200C may be received at access points 2400E, 2400F, 2400G and 2400H; and EM radiation carrying information emitted by client device 2200D may be received at wireless access points 2400F and 2400H. The information emitted via EM radiation from client device 2200C may comprise authentication information which matches a location estimation criterion employed by the wireless client device filter logic. On the other hand, the information emitted via EM radiation by client device 2200D may not meet a location estimation criterion. Accordingly, monitoring engine 2100 may estimate the location for client device 2200C but not for client device 2200D.

In some embodiments, wireless-based client device mapping module 2124 may comprise a client device location module that is provided by a vendor of wireless networking equipment and which estimates the location of a client device in functional facility 1000. For example, wireless-based client device mapping module may comprise a Cisco® services mobility service module providing facility monitoring system 2000 with data descriptive of the location of a client device, e.g., based on RSSI. Clearly, the location of a client device does not necessarily have to be estimated by such a vendor-provided device location module.

The wireless client device filter logic may not be applied in configuration of systems 2000 where a client device location module is provided by a vendor of wireless networking equipment.

According to some embodiments, data descriptive of a client device location, estimated based on values of parameters related to received EM radiation emitted by the client device, may be fused by monitoring engine 2100 with data descriptive of values provided by inertial sensors 2210i and/or non-inertial sensors 2210ii (FIG. 3).

Figure 10:
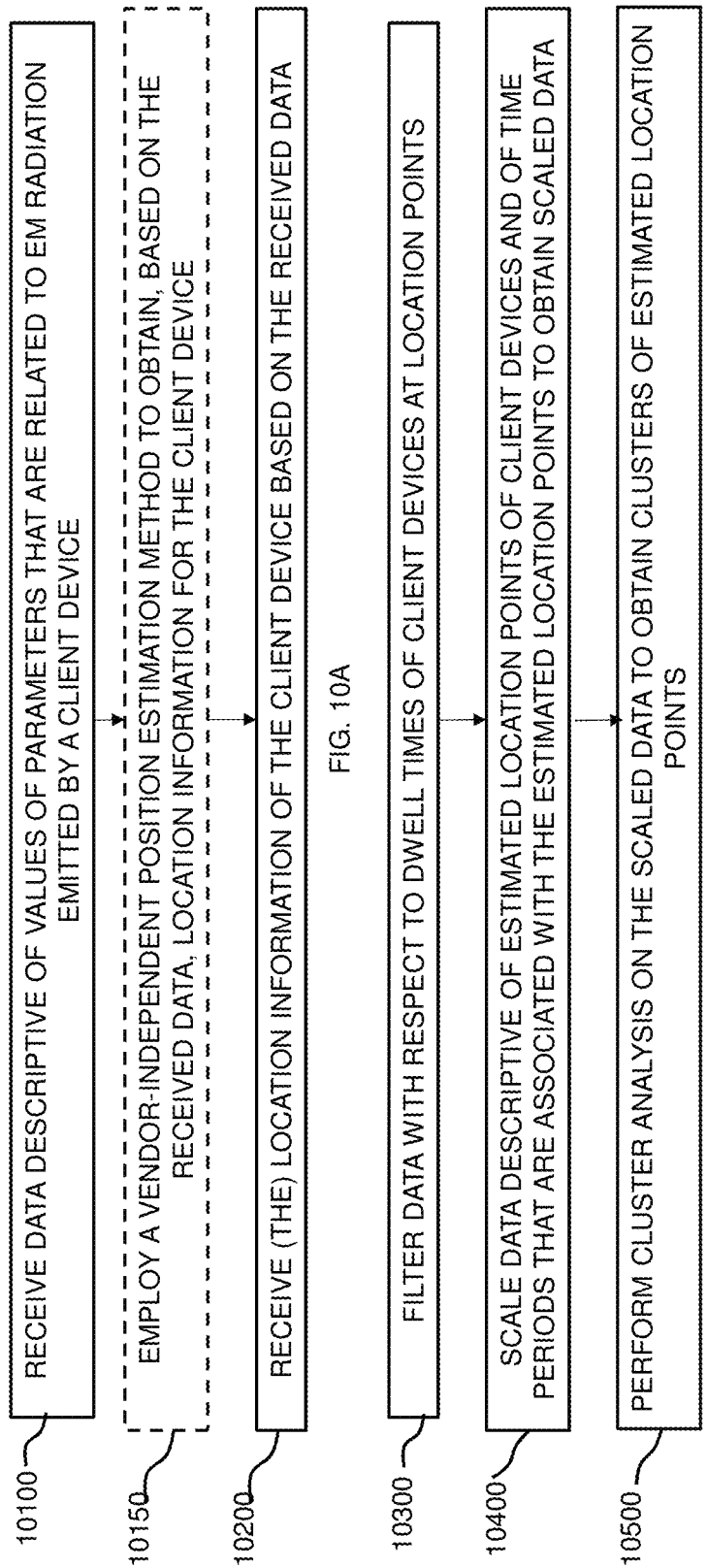
FIG. 10A shows a flow chart of a method for geographically mapping client devices based on wireless signals.
FIG. 10B shows a flow chart of a method for filtering and clustering data which is descriptive of geographically mapped client devices.

Reference is made to FIG. 10A, which schematically illustrates a flow chart of a method for geographically mapping client devices based on wireless signals, according to some embodiments. The method may include, as indicated by step 10100, receiving data descriptive of values of parameters that are related to EM radiation emitted by a client device.

As indicated by box 10150, the method may in some embodiments optionally include employing a vendor-independent position estimation method to obtain, based on the received data, location information for the client device.

In an embodiment, the method may further include, as indicated by box 10200, receiving the location information of the client device based on the received data. As is evident from the method steps 10100-10200, location information of a client device may be obtained from a wireless management module and/or by employing a vendor-independent position estimation method.

An example Pseudocode Implementation of method steps 10100 & 10200 is outlined herein below in which location information is received from a vendor-provided wireless management module:

estimated to be located for a comparably short dwell time period are disregarded. The location filter logic may, for example, comprise a sliding moving average or a sliding moving median, a low-pass filter technique or the like.

```
| | Lists of white-listed Access Points (APs) MAC addresses and SSIDs are pre-stored in a database of system
2000 | |:
AccessPointWhitelist = [AP1, AP2, AP5, AP10]
SSIDWhitelist = [ssid1, ssid2]
Function getWhitelistedClients(input: wireless management module) | | read list of clients from wireless
management module (e.g. Cisco MSE)
    1.  GET Clients (only column AP Mac Address, SSID, Client Mac Address) from module -> clients
    2.  For each client in clients:
            2.1.  If SSID in SSIDWhitelist AND AP Mac Address in AccessPointWhitelist:
                    2.1.1  Then: add client to clientWhitelist | | a client device identifier is stored if
                           the corresponding SSID and AP identifier are white-listed
    3.  For each client in clientWhitelist: | | retrieve further client device identification information and
        location information
            3.1.  New measurement object
            3.2.  GET Client (by client MAC Address) (column VLAN, IP, UserName, and others) and store
                  fields to measurement object
            3.3.  GET location indicator (by client MAC Address) and store location indicators list to
                  measurement object
            3.4.  Store measurement of location indicators in database
    3.  For each new measurement in database
            4.1.  estimate location using filtering and clustering based on location indicators (either
                  with an external software, and/or by using a Non Linear Model Fit solver) -> X/Y
                  coordinate
            4.2.  Store X/Y coordinate in measurement object
```

An example Pseudocode Implementation of method steps 10100, 10150 & 10200 is outlined herein below in which location information is obtained by employing a vendor-independent position estimation method:

According to some embodiments, values of measured parameters of time and location are scaled. The expression "scaling" as used herein, as well as grammatical variations thereof, may also encompass "normalizing". For example,

```
| | Lists of white-listed Access Points (APs) MAC addresses and SSIDs are pre-stored in a database of system
2000 | |:
AccessPointWhitelist = [AP1, AP2, AP5, AP10]
SSIDWhitelist = [ssid1, ssid2]
Function getWhitelistedClients(input: wireless LAN controller) | | read list of clients from wirelessLAN
controller (WLC)
    4.  SNMP GET Clients (only column AP Mac Address, SSID, Client Mac Address) from WLC -> clients
    5.  For each client in clients:
            2.2.  If SSID in SSIDWhitelist AND AP Mac Address in AccessPointWhitelist:
                    2.1.2  Then: add client to clientWhitelist | | a client device identifier is stored if
                           the corresponding SSID and AP identifier are white-listed
    4.  For each client in clientWhitelist: | | retrieve further client device identification information and
        RSSI
            4.1.  New measurement object
            4.2.  SNMP GET Client (by client MAC Address) (column VLAN, IP, UserName, and others)
                  and store fields to measurement object
            4.3.  SNMP GET RSSIs (by client MAC Address) and store RSSI list to measurement object
            4.4.  Store measurement of RSSI in database
    6.  For each new measurement in database
            4.3.  estimate location using trilateration from RSSIs (either with an external software,
                  and/or by using a Non Linear Model Fit solver) -> X/Y coordinate
            4.4.  Store X/Y coordinate in measurement object
```

According to some embodiments, monitoring engine 2100 may apply location filter logic on the estimated client device location information of a plurality of client devices to obtain location information for a selection of respective client devices. Such filter logic may, for example, be aimed at "smoothing" out data points that are descriptive of time vs location, e.g. to remove outliers. In some embodiments, filtering may be employed with respect to comparably short time periods or dwell times of client devices at estimated location points. By smoothing such data points, comparably short periods of dwell time of a client device at an estimated location may be disregarded in a facility usage analysis. Accordingly, the location points at which client devices are values of x/y coordinates may be scaled to range from 0 to 1 (or 0-100%) of a floor's dimension, i.e. [0,1]. Further, time measurements may for example be scaled to a scale ranging from 0 to 1, i.e. [0,1], and expressed in units of milliseconds.

According to some embodiments, cluster analysis may be performed on data which is descriptive of estimated location points of wirelessly communicating client devices and associated time stamps of recordation of the estimated location points. The cluster analysis may be performed by monitoring engine 2100, e.g. by wireless-based client device mapping module 2124 of mapping module 2120.

Each one of a plurality of wireless client devices may be grouped by clustering to obtain data clusters. For instance, location points and time stamps respective of each one of a plurality of wireless client devices 2200 may be grouped according to the geographic distribution of the location points as a function of time. For example, for a given time stamp, a group of location points may be associated with a cluster if they are distributed in a certain geographic area within a relatively higher density than other location points. Cluster analysis techniques that may be employed may include, for example, Density-based Spatial Clustering of Applications with Noise (DBSCAN), K-Means, or the like.

Once the organization of the data points in clusters is finalized, monitoring engine 2100 may in some embodiments determine a center point for each cluster. Further, with respect to each location point in a cluster which is associated with a given client device, a time stamp («start time») is recorded at which the appearance of location point is registered. If applicable, for each client device a time stamp («end time») is recorded at which the disappearance of the time stamp is registered by monitoring engine 2100, subsequent to recordation of the time stamp of appearance («Start time») of the same client device. In addition, for each estimated location point which is associated with the same client device in a cluster, a distance may be determined between the client device and the cluster's centerpoint. Depending on the distance of an estimated location point of a client device from a cluster centerpoint, the location point may remain a member of the cluster or be removed from the cluster, e.g., by associating the location point to another cluster. The number of location points in a cluster may thus be updated dynamically by monitoring engine 2100. The cluster analysis may be repeated at (e.g. regular) intervals. The usage of functional facility 1000 may thus be facilitated by monitoring engine 2100 which is operative to dynamically determine clusters of estimated location points of wireless client devices (e.g. client devices 2200A-2200C).

Estimated location points of client devices 2200 may be associated with floor numbers.

Accordingly, cluster analysis may, in some embodiments, be performed on a floor-by-floor basis.

Referring to FIG. 10B, a method for filtering and clustering of data descriptive of geographically mapped client devices may include, in some embodiments, as indicated in step 10300, smoothing data with respect to dwell times of client devices at location points.

The method may in some embodiments further include, as indicated by step 10400, scaling data which is descriptive of estimated location points of client devices to obtained scaled data.

The method may further include, as indicated by step 10500, performing cluster analysis, e.g. according to the geographic distribution of the location points as a function of time on the scaled data, to obtain clusters of estimated location points. Based on the data clusters, usage of a functional facility may be determined or monitored.

An example Pseudocode Implementation of method steps 10300-10500 is outlined herein below:

```
Function filterAndClusterMeasurements
    1.  Get all unique Client Mac Addresses x Floor combinations of day
    2.  For each Mac Address x Floor:
            1.  Get all measurements for Mac Address, Floor, day
            2.  Filter measurements
            3.  Scale measurements
            4.  Cluster measurements in 3 dimensions (X, Y, and time)
            5.  For each cluster:
                    1.  determine center point of cluster
                    2.  Get smallest time from all points in cluster
                    3.  Get largest time from all points in cluster
                    4.  Create new measurement object with:
                            client Mac Address,
                            floor,
                            x/y location (from centerpoint)
                            Start time = smallest time from cluster points
                            End time = largest time from cluster points
    3.  Store all measurements
Function filterMeasurements:
        Apply sliding median algorithm with a fixed window length
Function scaleMeasurements:
        scale each dimension (X, Y and time) individually:
        scaleXDimension and scaleYDimension:
                linearize all measurements X (resp Y) onto interval 0 1
        scaleTimeDimension:
            1.  convert time to milliseconds
            2.  linearize all times onto interval 0 to 1
Function clusterMeasurements (trivial)
        use either DBSCAN or Kmeans(++) clustering algorithm in X, Y and Time dimension
```

According to some embodiments, location point information of a functional facility may be classified according to the dwell time criterion into a selected one of two or more location classifications of, e.g. "free", "occupied" and optionally "warm", according to one or more classification criteria by a classifier engine (not shown) employed by monitoring engine 2100. Such classification criteria may relate to thresholds of vacant time periods, dwell time periods of a client device at a location point, and the identifier of the client device, as outlined herein below in greater detail. Optionally, machine learning may be employed by classifier engine, e.g., dynamically adjust thresholds pertaining to vacant time periods and/or to dwell time periods. In an embodiment, different thresholds may be associated (e.g., automatically) with different types of functional facilities. For example, thresholds may be different for trading floor than for multi-story parking garages.

Generally, a location point may be classified as "occupied" if a client device is associated with network 2900 during a predetermined time period at the location point. Further, a location point may be classified as "free" if no client device is associated with network 2900 at that location. Finally, a location point may be classified as "warm" if a client device leaves a location point and the same client device returns to the previous location point within a certain time interval and no other client device connected to the said location point during this time interval. The terms "time interval" and "time period" may be used interchangeably.

In some examples, a location point may be classified as "free" at time period(s) during which the location point is neither classified as "warm" or "occupied" by client devices, provided that such time period exceeds a first vacant time period threshold. In some embodiments, a location point may remain classified as "free" when the said time period exceeds the first vacant time period threshold and any dwell time which is measured from the time stamp at which the device is not registered with the location does not exceed a first dwell time period threshold.

In some examples, a location point may be classified as "occupied" at time period(s) during which the location point was continuously occupied by one or more client devices, provided that such time period exceeds a second dwell time period threshold. Correspondingly, the above noted first dwell time period is smaller than or can be equal to the second dwell time period threshold.

In some examples, the location point may remain classified as "occupied" even if the client device has left and returned to the same location period within a time period which does not exceed a second minimum vacant threshold. Correspondingly, the first vacant threshold may be greater than or equal to the second minimum vacant threshold.

Considering "occupying", for instance, monitoring engine 2100 may, in some embodiments, only consider or register that a certain location of functional facility 1000 is used by a client device when the location information which is associated with the device meets the corresponding classification (e.g. dwell time) criterion. For example, a client device may be considered to "use" a certain location in functional facility 1000, when monitoring engine 2100 determines that the client device continuously occupies or is continuously located at about the same location for a time period which exceeds the second dwell time period threshold. The second dwell time period threshold may, for example, be set to at least 3 minutes, at least 4 minutes, at least 5 minutes, at least 6 minutes, at least 7 minutes, at least 8 minutes, at least 9 minutes, at least 10 minutes, at least 20 minutes, at least 30 minutes, at 60 minutes, or at least 120 minutes. In the following two scenarios, a threshold time period with a dwell time of 30 minutes is exemplified. In a first scenario, for instance, client device 2200C which is connected with the same port (e.g. via docking station 2920(II)(I) from 9:00 AM to 11:00 AM is considered a single use or visit. In another second scenario for instance, client device 2200C connected with LAN connection 2920(I)(1) for 30 minutes from 9:00 AM to 9:30 AM (e.g. located on a personal desk) and from 9:30 AM to 10:00 AM with LAN connection 2920(II)(1) (e.g. located in a meeting room) and then again with LAN connection 2920(I)(1) from 10:00 AM to 11:00 AM (located on the same personal desk), is considered or registered as three distinct uses or visit.

It should be noted that the term "continuously" may in some embodiments also encompass the meaning of the term "substantially continuously". Accordingly, in some embodiments, relatively brief time periods (also: first dwell time period threshold) of disconnection between, for example, a client device and a port, may not be deducted from the dwell time of a client device. Time periods of continuous disconnection that may be disregarded when measuring dwell time may for example be 60 seconds or less, 50 seconds or less, 40 seconds or less, 30 seconds or less, 20 seconds or less, 10 seconds or less, 5 seconds or less, 2 seconds or less, or 1 second or less. In some embodiments, the time periods that may be disregarded may be defined by a fraction of the second dwell time period threshold such as, for instance, 1/10 or less, 1/15 or less, or 1/20 or less, or 1/50 or less of the second dwell time period threshold.

In an embodiment, a location point may be classified as "warm" if a client device which was registered as occupying a location point leaves or unregisters from the location point; and the time period that has passed since the client device has left the location point does not exceed a time period which is greater than the first vacant time period threshold. In some embodiments, the location point may remain classified as "warm" even if another or the same client device is again registered as being present at the location point for a time period which does not exceed a minimum dwell time period. While the following example scenarios are outlined with respect to client devices 2200B and 2200C, this should by no means construed limiting. Therefore, the described example scenarios are equally applicable to other wireless and non-wireless client devices as well.

i) Considering a first example scenario, in which:
ii) 8:00 AM to 10:00 AM—Employee 1 is associated with a client device (e.g., device 2200B) and sits at a Desk A (not shown);
iii) 10:00 AM to 10:30 AM—Employee 1 takes his/her client device 2200B into a meeting room which is located remotely (e.g. at least 50 meters) from the Desk A;
iv) 10:30 AM to 12:00 AM—Employee 1 takes his/her client device 2200B back to Desk A.
If the first vacant time period threshold is 4 hours, for instance (which defines the threshold for "warm"), the estimated location point associated with client device 2200B from 10:00 AM to 10:30 AM will be classified as "warm".

Considering a second example scenario in which:
i) 8:00 AM to 10:00 AM—Employee 1 with client device 2200B sits at a Desk A (not shown);
ii) 10:00 AM to 5:30 PM—Employee 1 takes his/her client device 2200B into a meeting room which is located remotely (e.g. at least 50 meters) from the Desk A;
iii) 5:30 PM to 6:00 PM—Employee 1 takes his/her client device 2200B back to Desk A.
The time interval from 10:00 AM to 5:30 PM is 7.5 hours which is greater than the first vacant time period threshold of 4 hours. Consequently, the estimated location point which is associated with Desk A may either be classified as "free" from 10:00 AM to 5:30 PM; or as warm from 10:00 AM to 2:00 PM and as "free" from 2 PM to 5:30 PM.

Considering a third example scenario in which:
i) 8:00 AM to 10:00 AM—Employee 1 with client device 2200B sits at a Desk A (not shown);
ii) 10:00 AM to 10:30 AM—Employee 1 takes his/her client device 2200B into a meeting room which is located remotely (e.g. at least 50 meters) from the Desk A;
iii) In the meantime, e.g. from 10:10 AM to 10:20 AM employee 2 takes his/her client device 2200C at Desk A;
iv) 10:30 AM to 12:00 AM—Employee 1 is again located by Desk A.

a) Now considering, for example, that the first vacant time period threshold is set to: 4 hours; and
b) the second dwell time period threshold is set to: 5 minutes, the location point which is associated with Desk A is neither classified as "warm" nor as "free", but as "occupied", since client device 2200C of Employee 2 was at Desk A for a time period which exceeded dwell time period threshold which is set to 5 minutes, during the time period which is initially defined as "warm". More specifically, the location point may remain classified as "warm" as long as no client device occupies the location point during the first vacant time period threshold for the second dwell time period threshold. Otherwise, the location point is classified as "occupied".

Figure 11:
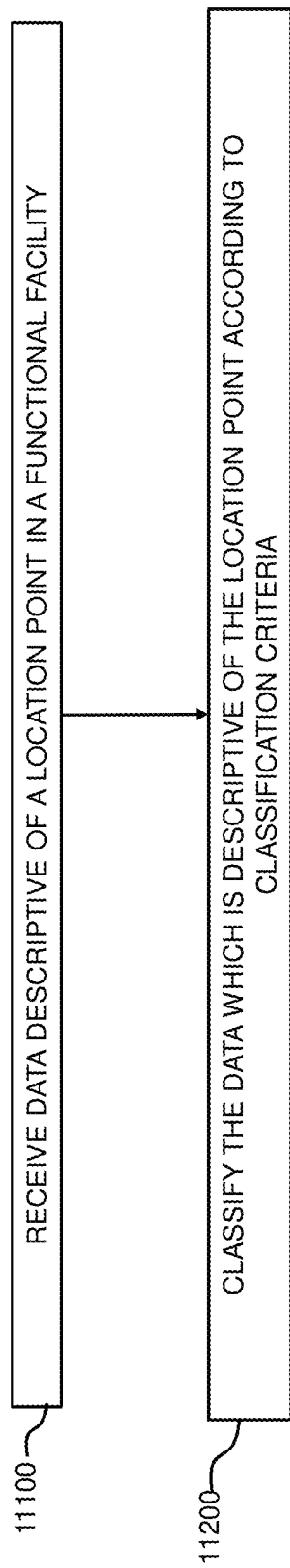
FIG. 11 shows a flow chart of a method for classifying location points of a functional facility.

Referring to FIG. 11, a location point classification method may include in some embodiments, as indicated by step 11100, receiving data which is descriptive of a location point in a functional facility.

In an embodiment, the method may further include, as indicated by step 11200, classifying the data which is descriptive of the location point according to classification criteria, e.g., by a classifier. Such classification criteria may relate to thresholds of vacant time periods, dwell time periods of a client device at a location point, and to the identifier of the client device, as outlined herein below in greater detail.

An example Pseudocode Implementation of location point classification method steps 11100 to 11200 is outlined herein below:

Concurrently, another client device 2200B which is associated with the given user is wirelessly communicably coupled with an access point such as, e.g., detector 2400F. If the location of wirelessly coupled client device 2200A is estimated to be within a certain range of LAN connection 2920(II)(B) for a certain time period, the location of LAN connection 2920(II)(B) may be associated with client device 2200A. For example, data descriptive of the estimated location of client device 2200A may be deleted, discarded, disregarded, or overwritten. If before associating the location of LAN connection 2920(II)(B) with client device 2200A, the LAN connection's location point was classified as "occupied", the same classification category may be retained after associating the LAN connection's location point with client device 2200A.

Conversely, if the location of wirelessly coupled client device 2200A is estimated to be outside a certain range of the location of LAN connection 2920(II)(B) for a certain time period, the estimated location point may remain associated with wireless client device 2200A and the location point of LAN connection 2920(II)(B) remains associated with the latter.

In the scenario where the location of LAN connection 2920(II)(B) is associated with the first wirelessly coupled client device 2200A because the latter is estimated to be within a certain range of LAN connection 2920(II)(B) for a certain time period, and the location of wirelessly coupled client device 2200A is thereafter to be outside a certain range of the location of LAN connection 2920(II)(B) for a certain

---

Setting Warm Period. In the following example: 4 hours
The following function returns Occupied + Warm measurements. The input is a list of «occupied» measurements, the output is a list of measurements for desks that are either «warm» or «occupied».
Function getMeasurementsWarmAndOccupied (input: list of measurements)
    1. Create empty list of «occupied + warm» measurements
    2. Index list of measurements by location
    3. process each location individually:
        1. Process each measurement for this location individually:
            1. «this measurement» is the measurement we're currently iterating over
                «previous measurement» is the last measurement which we have added to the
                «occupied + warm measurement list»
            2. Is this the first measurement?
                1. => add this measurement to the «occupied+warm» list
                2. Continue with the next measurement
            3. Is the user on the previous measurement == the user on this measurement?
                1. Is «end-time» (time down) of the previous measurement» + «Warm
                    Period» after the «start-time (start time) of this measurement»?
                    1. => update the previous measurement and set «end time» to this
                      measurement's «end time»
                    2. Continue with next measurement
                2. Else:
                    1. => add this measurement to the «occupied+warm» list
                    2. Continue with the next measurement
            4. Else:
                1. => add this measurement to the «occupied+warm» list
                2. Continue with the next measurement
        2. Process next location
    4. Return list of «occupied + warm measurements», i.e. listing from which start- to end-time each
        desk was either occupied or warm

---

In another implementation, only «warm» desks are returned, which may, for example, be achieved by determining the difference between «occupied and warm»–«occupied only».

In some examples, data pertaining to wired local area network (LAN) may be prioritized over wireless LAN data. Considering for example a scenario exemplified in FIG. 2 in which client device 2200A (e.g., a laptop computer), which is located in area 1105B and associated with a given user, is operatively coupled with a LAN connection 2920(II)(B)/2400(II)(B), e.g., through a docking station (cf. FIG. 6).

time period, the association of the location of LAN connection with client device 2200A may be discontinued and the location of wirelessly coupled client device 2200A may be determined independent from the location LAN connection 2920(II)(B). For example, the location of wirelessly coupled client device 2200A may again be based on EM radiation parameters relating to client device 2200A, e.g., as outlined herein.

It is noted that a client device identifier (e.g., a media access control or MAC address) of first client device 2200A may be different from that of second client device 2200B.

However, as already indicated herein, system 2000 may nevertheless be operative to associate different identifiers of at least two client devices (e.g., first and second client devices 2200A and 2200B) to the same user, e.g., because at least one of the at least two client devices (e.g., second client device 2200B) may require user-based authentication to authenticate the at least one client device, and for verifying eligibility of the at least one client device (e.g., second client device 2200B) to access network 2900 (e.g., via a LAN connection). Based on the input provided by the user in authenticating second client device 2200B to network 2900, system 2000 may be operative to determine if the same user is associated with the (LAN connected) client device (e.g., client device 2200B) and another wireless client device (e.g., client device 2200A).

Optionally, the classification of the location point associated with LAN connection 2920(II)(B) may be changed from category "occupied" to another category such as, for example, "warm" or "free".

In some embodiments, the classification of location point may be connection-dependent. For instance, in case of a wired connection with a detector of a LAN connection for a certain dwell time, the location associated with the LAN connection may be classified as "occupied" or "warm", e.g., depending on the system configuration, e.g., because of varying dwell time thresholds between different systems or different LAN connections of the system. In any case, if the location of a first client device is estimated to be within a certain range of a second client device that is concurrently coupled with a LAN connection, and both the first and second client device are identified as being associated (e.g., belonging) to the same user, then the location associated with the LAN connection may be classified as being "occupied".

In some embodiments, a client device associated with a user may be mapped to the closest free location which is within a certain range of a wireless-based location estimate of the same client device. The location information of the closest free location may then be used for determining a level of occupancy (also: level of usage) of various locations in and/or of functional facility 1000 at a selected time stamp and/or during a selected period of time.

The term "closest" is relative to the wireless-based location estimate. A location may be considered "free" at a point in time if no client device of a different user is mapped to that location. A location may be considered free, for example, if no LAN connection is made by another client device at that location and/or if a WLAN communication link capacity for that location is not exceeded, e.g., as inferred or determined in system 2000 based on the available physical infrastructure. While certain location information may be mapped to a client device and taken into account (e.g., for statistical analysis) for determining usage of a functional facility, other location information which may at the same time also be associated with the client device may not be taken in account for determining usage of a functional facility. For instance, in the previous above example, the wireless-based location estimate associated with the client device may not be taken into account in the statistics for determining a level of occupancy, yet the estimate may still be associated with the client device and continuously updated.

For example, if first and second LAN connections 2400B and 2400C (cf. FIG. 2) are within a certain range of an estimated time-position tuple of first wireless client device 2200A that is associated with or of a first user, yet the location of first LAN connection 2400B is classified as occupied by a client device of another user, as opposed to the location associated with second LAN connection 2400C which is classified as "free", then location information of first wireless client device 2200A is mapped to the location of second LAN connection 2400C. The client device 2200A may be mapped to the location of LAN connection 2400C even if the location of client device 2200A is estimated to be in closer range to the location of LAN connection 2400B than to LAN connection 2400C.

In a scenario in which all LAN connections that are within a certain range of a wireless-based location estimate of a given client device are classified as "warm" or occupied by client devices of other users, then the given client device may be mapped to the closest "warm" LAN connection location. In one example, if except for one free LAN connection location all other LAN connection locations within a certain range of the client device are classified as "warm" or "occupied", then the client device may be mapped to the free LAN connection, even if its location is farthest from the wireless-based location point. In another example, the client device may be mapped to the closest "warm" LAN connection location.

It is noted that in the discussion that follows, the expression "anonymizing an identifier" may refer to anonymizing one or more identifiers of a client device, of a user, or both.

According to some embodiments, data descriptive of identifiers of client devices may be anonymized to yield anonymized data for protecting the privacy of the users that are associated with the client devices which location are tracked by monitoring engine 2100. Anonymization may be performed while simultaneously enabling utility of the resulting anonymized data with respect to monitoring of facility usage. One or more of a variety of data anonymization techniques may be executed by anonymization module 2150 of monitoring engine 2100 to yield anonymized data. An example of an anonymization technique that may be employed includes hash encoding, optionally in combination with a randomly (or pseudo-randomly) generated string, also known as "salt". In one embodiment, the random string may remain unchanged or constant for a given set of data to be anonymized. In another embodiment, the random string may change dynamically, e.g., periodically.

In an embodiment, an anonymization technique may include the procedure of receiving data which is descriptive of an anonymization level to be applied by anonymization module 2150. The number of anonymization levels that may be applied by anonymization module 2150 may vary for different embodiments and should not be limited to the examples outlined herein.

For example, three different levels of anonymization may be applied: either a first, non-anonymized level; a second, mid-anonymized level (also: "team level"); or a third, high-anonymized level (also: "company level"). The non-anonymization level may allow unlimited tracking of client devices 2200, i.e. no restrictions are imposed as to the privacy of the users of the client devices. The mid-anonymization level may provide some privacy protection to the users of client devices 2200. For example, the client devices may be anonymized on a "team level". For instance, the identifiers of client devices of a first group of users may be associated with a first team (e.g., "IT team") of a "Company A", and the identifiers of client devices of a second group of users may be associated with a second team (e.g., "HR team") of the same company "company A". Optionally, the identifiers associated with the first team may all be different from the identifiers which are associated with the second team. Optionally, one or more identifiers may be associated with two or more different teams of the same company.

The high-anonymization level may provide a higher level of anonymization, i.e. privacy protection, compared to the mid-anonymized level. For example, the users may be anonymized on a company level. For instance, the identifiers of client devices of a first group of users may be associated with a first company name (e.g., "Company A", and the identifiers of client devices of a second group of users may be associated with a second company name (e.g., "company B"). Optionally, one or more identifiers may be associated with two or more identical companies.

In some embodiments, the mid- and high-anonymization may each have two or more anonymization sublevels. The plurality of anonymization sublevels may, for example, be defined by respective levels of client device traceability. Accordingly, in some embodiments, the applied anonymization technique may include the procedure of receiving data which is descriptive of a device traceability level which may then applied by anonymization module 2150.

For example, in a first traceability level, which may herein also be referred to as "single visit level", every time the presence of a client device is detected by one or more detectors 2400, the identifier(s) of the client device and/or of the user(s) which is associated with the client device's identifier(s) is anonymized. For instance, it may be known that the user is a member of a certain team, but whether or not it is the same user of the team that re-visited the same location may remain unknown/anonymized. For instance, each time, e.g. client device 2200A connects with a port of a network switch, e.g. via a docking station 2920, and/or each time a wireless access points receives a signal from client device 2200A carrying data descriptive of identifier(s), anonymization module 2150 may anonymize the corresponding identifier(s). Accordingly, no two "visits" or device detections can be linked to the same client device and/or user thereof. In this first traceability level, time stamps which indicate a time of recordation of a location of a client device may not be truncated, i.e., recorded "as is".

In a second traceability level, for example, which may herein also be referred to as "intra-time level", the identifier(s) respective of a client device (and/or user thereof) may be associated with identical anonymizing identifiers during a certain time period. Hence, the identifier's association to a team may be known, and it may also be known if within a time period the same user of the team re-visited the same location. However, the user's identity may still be anonymized. Accordingly, occurrences of detections by the one or more detectors within the time period, of the client device within the time period may be linked. For example, an identifier of client device 2200C that is detected for the first time within a time period by a detector (e.g., detector 2400B), may be anonymized to yield anonymized data descriptive of an anonymized identifier which is unique to client device 2200C. The same anonymized identifier may remain associated with client device 2200C as long as the time period has not passed. Once the time period has passed, other anonymized data may be associated with client device 2200C. Again, the other anonymized data may remain associated with the same client device as long as the time period has not passed. In some embodiments, the time periods may alter dynamically. Such time period may, for example, have a duration of 4 hours, 8 hours, 12 hours, 24 hours or 36 hours. The time stamp for starting the measurement of such a time period may vary and start, for example, at 0:00 AM, 6:00 AM, 12:00 AM. In this second traceability level, when, for example, the periods are calendrical days, the hours, minutes and seconds of the time stamps are truncated.

In a third traceability level, for example, the same anonymized data may remain associated with the respective client device, irrespective of any time period. For example, the same anonymization data may remain associated with client device 2200B, once the presence of client device 2200B in functional facility 1000 is detected. In the third scenario, the time stamp is truncated in its entirety. The third traceability level may allow the tracking of client devices on a team-by-team basis, yet without being able to determine if a user of the same team re-visited the same location more than once within the (predetermined) time period.

Figure 12:
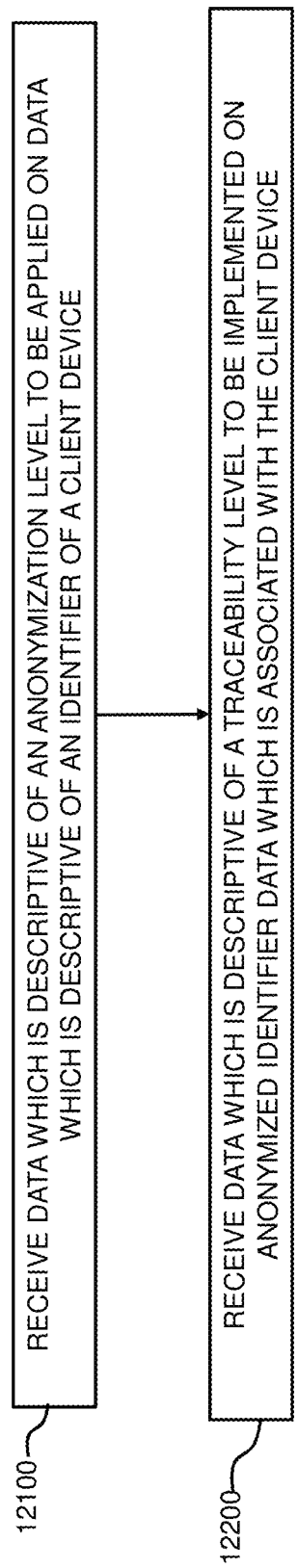
FIG. 12 shows a flow chart of an anonymization method.

Referring to FIG. 12, an anonymization technique may include, in some embodiments, as indicated by step 12100, receiving data which is descriptive of an anonymization level to be applied on data which is descriptive of an identifier of a client device.

In an embodiment, the method may further include, as indicated by step 12200, receiving data which is descriptive of a traceability level to be implemented in a client device which is associated with anonymized identifier data.

An example Pseudocode Implementation of anonymization method steps 11100 to 11200 is outlined herein below:

---

| | Client devices and, hence, their users, are anonymized | |
Function anonymizeUser (input: identified user, input: timestamp)
        1.    Switch Anonymity Level
                1.    Anonymity Level User
                      1.    Then (this is no anonymization at all): return identified user
                2.    Anonymity Level Team or Anonymity Level Global
                      1.    Switch Traceability Level
1.    Traceability Level Single Visit:
                1.    truncatedTimestamp = timestamp (no truncation)
2.    Traceability Level Intraday
                1.    truncatedTimestamp = Truncate Time from Timestamp (i.e. 2015-12-30 15:25 becomes 2015-12-30 00:00)
3.    Traceability Level Permanent
                1.    truncatedTimestamp = NULL (equivalent to truncating both date and time from the timestamp)
        2.    Calculate hash of «salt» + «ID of identified user» + «truncatedtimestamp» (hash function could be MD5 or SHA512)
        3.    Find anonymized user with this hash in database
        4.    If no anonymized user found in database:

```
1.    Create new anonymized user with this hash
2.    If Anonymity Level == Team
                 1.   Assign anonymized user to the same teams as the identified user is
                      assigned to
3.    Save anonymized user to database
             5.   Return anonymized user
```

Figure 13:
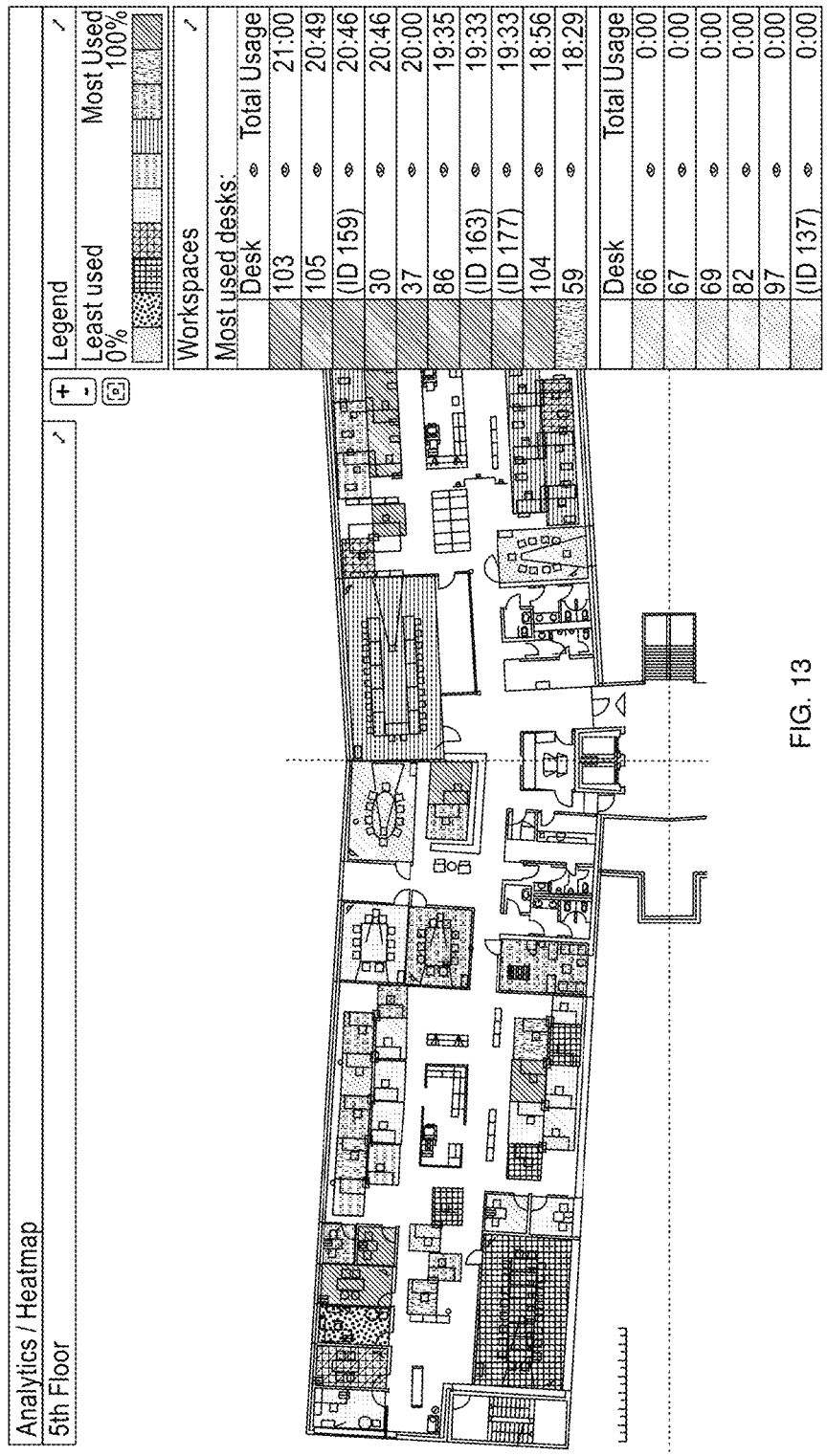
FIG. 13 shows an example heat map image which is descriptive of the usage of a floor in a functional facility by client devices over a prolonged time period.

FIG. 13 shows an example heat map image which is descriptive of the usage of a floor in a functional facility by client devices over a prolonged time period. The heat map refers to the usage during a time period of 72 hours, e.g. from Apr. 1 2015-Apr. 3 2015.

Figure 14:
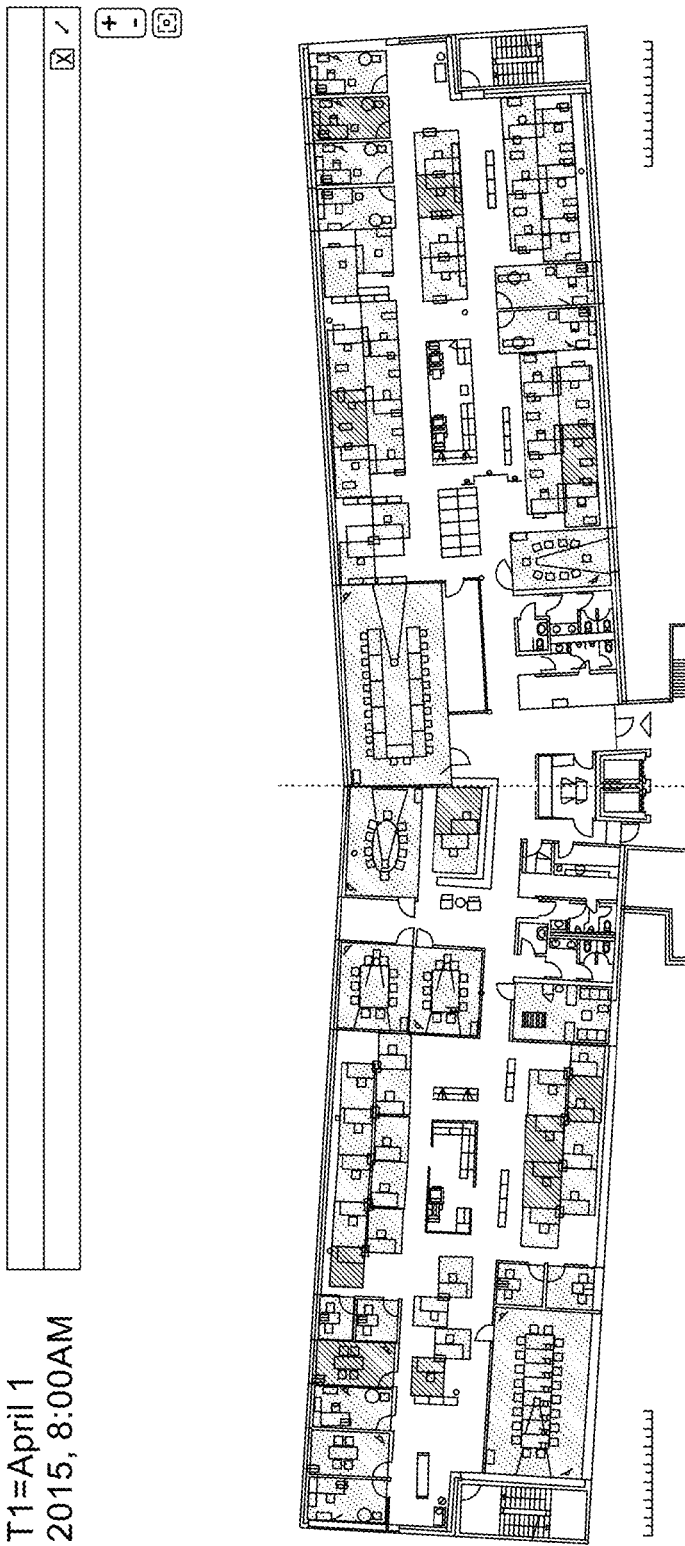
FIG. 14 shows an example snapshot image of the floor recorded at a first time of recordation.

FIG. 14 shows an example snapshot image of the floor recorded at a first time of recordation, e.g. at 8:00 AM on Apr. 1 2015.

Figure 15:
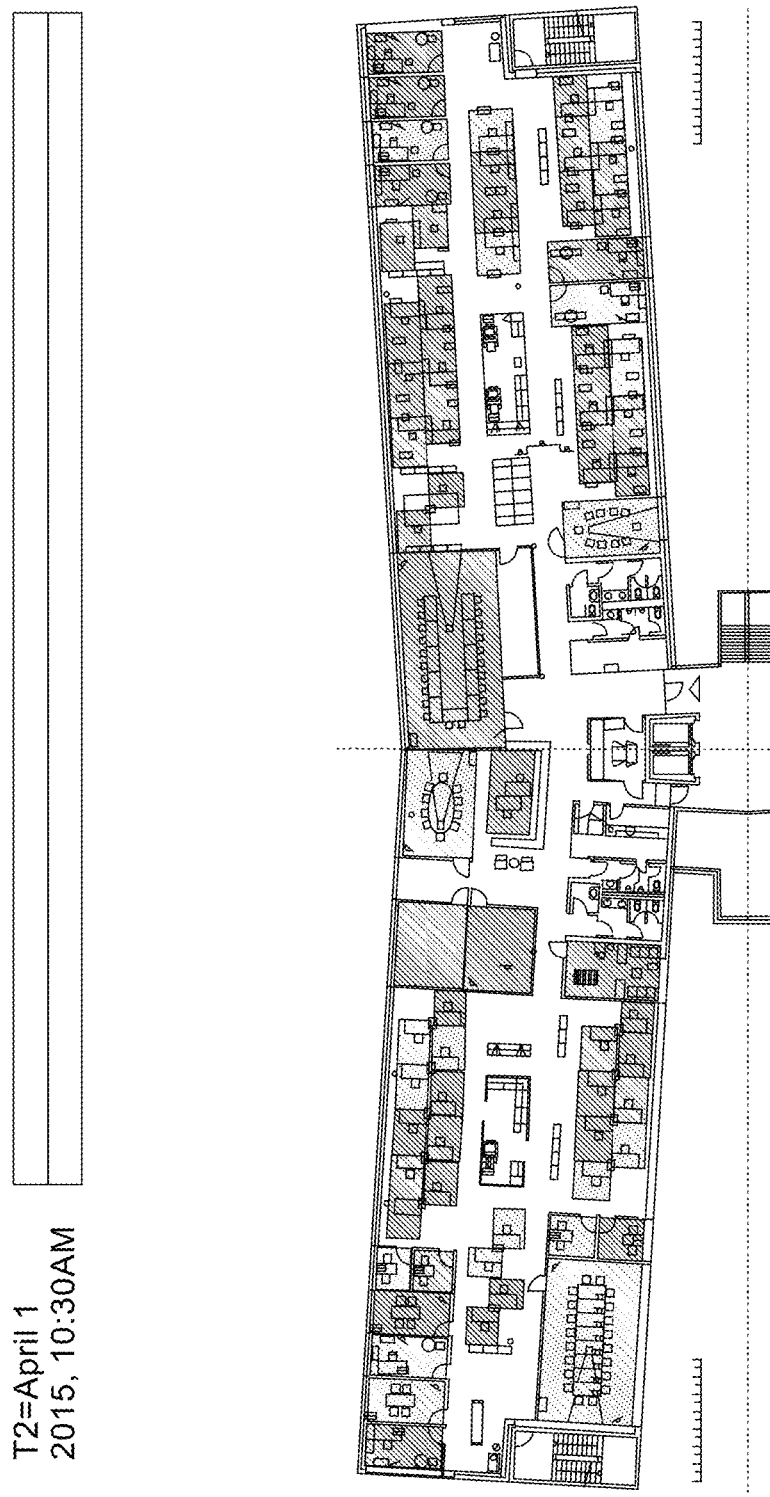
FIG. 15 shows an example snapshot image of the floor recorded at a second time of recordation.

FIG. 15 shows an example snapshot image of the floor recorded at a second time of recordation, e.g. at 10:30 AM on Apr. 1 2015.

FIG. 16 shows an example snapshot image of the floor recorded at a third time of recordation, e.g. at 1 PM on Apr. 1 2015.

Areas with green coloration indicate that an area is vacant at the time of recordation of the snapshot image. Areas with red coloration indicate that an area is occupied at the time of recordation of the snapshot.

Figure 17:
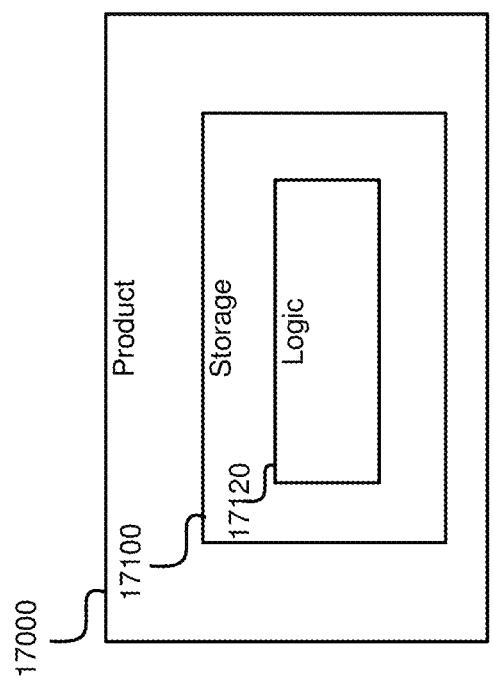
FIG. 17 is a schematic block diagram illustration of a product of manufacture.

Reference is made to FIG. 17 which schematically illustrates a product of manufacture 17000, according to some embodiments. Product 17000 may include a non-transitory tangible machine-readable storage medium 17100 to store logic 17120, which may be used, for example, to perform at least some of the functionality of facility monitoring engine 2100.

Unless otherwise stated, the use of the expression "and/or" between the last two members of a list of options for selection indicates that a selection of one or more of the listed options is appropriate and may be made.

In the claims or specification of the present application, unless otherwise stated, adjectives such as "substantially" and "about" modifying a condition or relationship characteristic of a feature or features of an embodiment of the invention, are understood to mean that the condition or characteristic is defined within tolerances that are acceptable for operation of the embodiment for an application for which it is intended.

It should be understood that where the claims or specification refer to "a" or "an" element, such reference is not to be construed as there being only one of that element.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

The term "real-time" as used herein may also encompass the meaning of the term "substantially in real-time" or "about real-time".

According to an embodiment, the platform and associated receivers may detect communication signals emitted from computerized end-user devices which may, for example, include a multifunction mobile communication device also known as "smartphone", a personal computer, a laptop computer, a tablet computer, a personal digital assistant, a wearable device, a handheld computer, a notebook computer, a vehicular device and/or a stationary device It is noted that the term "detection" as well as grammatical variations thereof may encompass any processes that enable such "detection", including sensing and/or monitoring.

The various features and steps discussed above, as well as other known equivalents for each such feature or step, can be mixed and matched by one of ordinary skill in the art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein. For example, any digital computer system can be configured or otherwise programmed to implement a method disclosed herein, and to the extent that a particular digital computer system is configured to implement such a method, it is within the scope and spirit of the disclosure. Once a digital computer system is programmed to perform particular functions pursuant to computer-executable instructions from program software that implements a method disclosed herein, it in effect becomes a special purpose computer particular to an embodiment of the method disclosed herein. The techniques necessary to achieve this are well known to those skilled in the art and thus are not further described herein. The methods and/or processes disclosed herein may be implemented as a computer program product such as, for example, a computer program tangibly embodied in an information carrier, for example, in a non-transitory computer-readable and/or non-transitory machine-readable storage device and/or in a propagated signal, for execution by or to control the operation of a data processing apparatus including, for example, one or more programmable processors and/or one or more computers. The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by a communication network.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The term "engine" may comprise one or more computer modules, wherein a module may be a self-contained hardware and/or software component that interfaces with a larger system (Alan Freedman, The Computer Glossary 268, (8th ed. 1998)). A module may comprise a machine or machines executable instructions. A module may be embodied by a circuit or a controller programmed to cause the system to implement the method, process and/or operation as disclosed herein. For example, a module may be implemented as a hardware circuit comprising, e.g., custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

In the description, unless otherwise stated, adjectives such as "substantially" and "about" that modify a condition or relationship characteristic of a feature or features of an embodiment of the invention, are to be understood to mean that the condition or characteristic is defined within tolerances that are acceptable for operation of the embodiment for an application for which it is intended.

The term "operably coupled" may encompass the meanings of the terms "responsively coupled", "communicably coupled", and the like.

Unless otherwise indicated, the word "or" in the description and claims is considered to be the inclusive "or" rather than the exclusive "or", and indicates at least one of, or any combination of items it conjoins.

It is appreciated that certain features of the invention, which are, for clarity, described in the context of separate embodiments or examples, may also be provided in combination in a single embodiment. Conversely, various features of the invention, which are, for brevity, described in the context of a single embodiment, may also be provided separately or in any suitable subcombination or, as suitable, in any other described embodiment of the invention. Certain features described in the context of various embodiments are not to be considered essential features of those embodiments, unless the embodiment is inoperative without those elements.

It is important to note that methods discussed herein are not limited to those diagrams or to the corresponding descriptions. For example, the methods may include additional or even fewer processes or operations in comparison to what is described in the figures. In addition, embodiments of the method are not necessarily limited to the chronological order as illustrated and described herein.

Discussions herein utilizing terms such as, for example, "processing", "computing", "calculating", "determining", "establishing", "analyzing", "checking", "estimating", "deriving", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The term "determining" and "estimating" may also refer to "heuristically determining" and "heuristically estimating", respectively.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

While the invention has been described with respect to a limited number of embodiments, these should not be construed as limitations on the scope of the invention, but rather as exemplifications of some of the embodiments.

What is claimed is:

1. A system for monitoring usage of a functional facility, comprising:
   a plurality of detectors for detecting the presence of at least one client device in the functional facility, wherein the plurality of detectors are geographically mapped in the functional facility;
   one or more processors; and
   one or more memories storing computer-executable instructions executable by the one or more processors to cause the system to perform the following steps:
      determining the location of the at least one client device detected by one or more of the plurality of detectors; and
      mapping the client device to a closest free location which is within a certain range of a wireless-based location estimate of the same client device,
      wherein a location is considered free if one or both of the following conditions is met:
      if no LAN connection is made by another client device at that location; and
      if a WLAN communication link capacity for that location is not exceeded.

2. The system of claim 1, wherein the steps further comprise:

classifying a location point of the at least one client device in the functional facility according to a dwell time criterion into one or more location classifications selected from:

"occupied", "free" and "warm", wherein a location point information is classified as "warm" if a client device leaves a location point and the same client device returns to the previous location point within a certain time interval and no other client device is connected to the said location point during this time interval.

3. A system for monitoring usage of a functional facility, comprising:

a plurality of detectors for detecting the presence of at least one client device in the functional facility, wherein the plurality of detectors are geographically mapped in the functional facility;

a memory storing computer-executable instructions; and a processor which, when executing the computer-executable instructions, performs the following steps:

determining the location of the at least one client device detected by one or more of the plurality of detectors, determining an estimate of a location point pertaining to a first client device which is associated with a user and wirelessly coupled with at least one of the plurality of detectors;

detecting a wired LAN connection that is made by a second client device associated with the user with at least one other of the plurality of detectors; and determining a distance between the estimated location point pertaining to the first client device and the location associated with the at least one other of the plurality of detectors; and if the distance is within a certain range, mapping the first client device to the location of the at least one other of the plurality of detectors.

4. The system of claim 3, wherein the steps further comprise:

keeping the estimated location point which is associated with the first client device, if the distance is outside a certain range.

5. The system of claim 3, wherein the steps further comprise:

providing an output which is indicative of the usage of the functional facility during a time interval, based on the location of the at least one client device in the functional facility during the time interval.

6. The system of claim 3, wherein the steps further comprise:

anonymizing identifiers that are associated with the geographically mapped client device.

7. The system of claim 6, wherein the step of anonymizing identifiers comprises:

executing an anonymization technique that includes applying different anonymization levels for anonymizing identifiers of the client devices.

8. The system of claim 7, wherein the step of executing an anonymization technique includes applying:

a first, non-anonymized level in which no restrictions are imposed as of users of the client devices by allowing unlimited tracking of the client devices;

a second, mid-anonymized level in which the client devices are anonymized on a team level such that identifiers of different groups of users are associated with different teams;

a third, high-anonymization level, in which the client devices are anonymized at company level.

9. The system according to claim 3, wherein the steps further comprise:

mapping of the LAN connections with ports of network switches, wherein the wire-based detector mapping module employs a caching procedure for the mapping of the LAN connections.

10. A method for monitoring usage of a functional facility including one or more detectors, comprising the following steps:

detecting the presence of at least one client device in the functional facility, wherein the plurality of detectors are geographically mapped in the functional facility;

determining the location of the at least one client device detected by one or more of the plurality of detectors, determining an estimate of a location point pertaining to a first client device which is associated with a user and wirelessly coupled with at least one of the plurality of detectors;

detecting a wired LAN connection that is made by a second client device associated with the user with at least one other of the plurality of detectors; and determining a distance between the estimated location point pertaining to the first client device and the location associated with the at least one other of the plurality of detectors, wherein if the distance is within a certain range, mapping the first client device to the location of the at least one other of the plurality of detectors.

11. The method of claim 10, further comprising the step of: determining a plurality of time intervals for a plurality of first client devices, each of the time intervals indicating a dwell time duration of each one of the first client devices at the respective estimated location points.

12. The method of claim 10, further comprising the step of: applying a filter logic on the estimated location points to obtain location information for a selection of the plurality of first client devices that is operably engaged wirelessly with a plurality of detectors.

13. The method of claim 12, further comprising the step of: performing cluster analysis on data which is descriptive of the estimated location points for the selection of the plurality of first client devices and the associated time stamps of recordation of the estimated location points.

14. The method of claim 13, further comprising the step of: providing a heat map which is indicative of the usage of an area in the functional facility during a time interval.

15. A system for monitoring usage of a functional facility, comprising:

a plurality of detectors for detecting the presence of at least one client device in the functional facility, wherein the plurality of detectors are geographically mapped in the functional facility; and a memory storing computer-executable instructions; and a processor which, when executing the computer-executable instructions, results in performing the following steps:

detecting the presence of at least one client device in the functional facility, wherein the plurality of detectors are geographically mapped in the functional facility;

determining the location of the at least one client device detected by one or more of the plurality of detectors, classifying a location point information of a function facility according to a dwell time criterion into a selected one of two or more location classifications according one or more classification criteria, the two or more location classifications comprising:

"occupied", "free" and "warm", wherein a location point information is classified as "warm" if a client device leaves a location point and the same client device returns to the previous location point within a certain time interval and no other client device connected to the said location point during this time interval.

16. The system of claim 15, further comprising the step of: determining a plurality of time intervals for a plurality of first client devices, each of the time intervals indicating a dwell time duration of each one of the first client devices at the respective estimated location points.

17. The system of claim 16, further comprising the step of: applying a filter logic on the estimated location points to obtain location information for a selection of the plurality of first client devices that is operably engaged wirelessly with a plurality of detectors.

18. The system of claim 17, further comprising the step of: performing cluster analysis on data which is descriptive of the estimated location points for the selection of the plurality of first client devices and the associated time stamps of recordation of the estimated location points.

19. The system of claim 18, further comprising the step of: providing a heat map which is indicative of the usage of an area in the functional facility during a time interval.

20. A system for monitoring usage of a functional facility, comprising:
a plurality of detectors for detecting the presence of at least one client device in the functional facility, wherein the plurality of detectors are geographically mapped in the functional facility;
one or more processors; and
one or more memories storing computer-executable instructions executable by the one or more processors to cause the system to perform the following steps:
determining the location of the at least one client device detected by one or more of the plurality of detectors; and
classifying a location point of the at least one client device in the functional facility according to a dwell time criterion into one or more location classifications selected from:
"occupied", "free" and "warm",
wherein a location point information is classified as "warm" if a client device leaves a location point and the same client device returns to the previous location point within a certain time interval and no other client device connected to the said location point during this time interval.

21. The system of claim 20, wherein a location is considered free if one or both of the following conditions is met:
if no LAN connection is made by another client device at that location; and
if a WLAN communication link capacity for that location is not exceeded.

* * * * *